United States Patent
Parikh et al.

(10) Patent No.: US 8,411,782 B2
(45) Date of Patent: *Apr. 2, 2013

(54) PARALLEL GENERATION AND MATCHING OF A DESKEW CHANNEL

(75) Inventors: Samir Parikh, Sunnyvale, CA (US); William W. Walker, Los Gatos, CA (US); Nestor Tzartzanis, Redwood City, CA (US)

(73) Assignee: Fujitsu Limited, Kawasaki-shi (JP)

( * ) Notice: Subject to any disclaimer, the term of this patent is extended or adjusted under 35 U.S.C. 154(b) by 855 days.

This patent is subject to a terminal disclaimer.

(21) Appl. No.: 12/511,917

(22) Filed: Jul. 29, 2009

(65) Prior Publication Data

US 2010/0086075 A1 Apr. 8, 2010

Related U.S. Application Data

(60) Provisional application No. 61/084,512, filed on Jul. 29, 2008.

(51) Int. Cl.
  *H04B 7/02* (2006.01)
  *H04L 1/02* (2006.01)
(52) U.S. Cl. ........................ 375/267; 375/259
(58) Field of Classification Search .................. 375/267, 375/260, 259
  See application file for complete search history.

(56) References Cited

U.S. PATENT DOCUMENTS

| | | | |
|---|---|---|---|
| 4,920,278 A | 4/1990 | Nawata | |
| 5,039,889 A | 8/1991 | Janta | |
| 5,343,097 A | 8/1994 | Takeuchi | |
| 6,381,291 B1 | 4/2002 | Yom | |
| 6,426,662 B1 | 7/2002 | Arcus | |
| 6,496,077 B2 | 12/2002 | Ahn | |
| 7,012,474 B2 | 3/2006 | Yen | |
| 7,286,625 B2 | 10/2007 | Lee et al. | |
| 7,420,870 B2 | 9/2008 | Park et al. | |
| 7,444,085 B2 | 10/2008 | Ikeuchi | |
| 7,446,616 B2 | 11/2008 | Lee | |
| 7,489,743 B2 | 2/2009 | Koh et al. | |
| 7,535,271 B2 | 5/2009 | Kizer | |
| 7,679,453 B2 | 3/2010 | Min | |

(Continued)

FOREIGN PATENT DOCUMENTS

WO    2008/018034    2/2008

OTHER PUBLICATIONS

Scalable SerDes Framer Interface (SFI-S): Implementation Agreement for Interfaces beyond 40G for Physical Layer Devices, IA# OIF-SFI-S-01.0, Nov. 2008.

(Continued)

*Primary Examiner* — David C. Payne
*Assistant Examiner* — Brian J Stevens
(74) *Attorney, Agent, or Firm* — Baker Botts L.L.P.

(57) ABSTRACT

In one embodiment, a method includes receiving input data bits at a collective data rate, the input data bits being grouped into a plurality of input data words, the input data bits of each of the input data words being received from n parallel input-data-bit streams, each of the n parallel input-data-bit streams having a stream data rate that is 1/n of the collective data rate, each of the input data words comprising n consecutive ones of the input data bits; selecting particular input data bits; and generating a k-bit deskew channel with the selected input data bits, the deskew channel comprising a number of frames, each of the frames comprising x input data bits from one or more input data words and one or more framing bits. In another embodiment, a method includes using such a deskew channel to determine relative delays between data channels and the deskew channel.

48 Claims, 24 Drawing Sheets

U.S. PATENT DOCUMENTS

| | | | |
|---|---|---|---|
| 7,737,791 | B2 | 6/2010 | Sareen et al. |
| 7,881,419 | B2 | 2/2011 | Shin |
| 7,924,071 | B2 | 4/2011 | Hiraku |
| 8,058,914 | B2 | 11/2011 | Kristensson |
| 8,138,798 | B2 | 3/2012 | Nedovic |
| 2002/0131539 | A1 | 9/2002 | Li et al. |
| 2003/0189464 | A1 | 10/2003 | Drapkin et al. |
| 2003/0198105 | A1 | 10/2003 | Yamaguchi |
| 2003/0198311 | A1 | 10/2003 | Song et al. |
| 2004/0022339 | A1 | 2/2004 | Nakao |
| 2006/0208811 | A1 | 9/2006 | Lee |
| 2006/0255866 | A1 | 11/2006 | Hirai |
| 2007/0006053 | A1* | 1/2007 | Otto et al. ............... 714/700 |
| 2007/0041486 | A1 | 2/2007 | Shin |
| 2007/0047972 | A1 | 3/2007 | Ikeuchi |
| 2008/0100364 | A1 | 5/2008 | Hiraku |
| 2008/0111634 | A1 | 5/2008 | Min |
| 2008/0192873 | A1 | 8/2008 | Tamura |
| 2008/0260071 | A1 | 10/2008 | Sidiropoulos |
| 2008/0309319 | A1 | 12/2008 | Herman |
| 2009/0009228 | A1 | 1/2009 | Jang |
| 2009/0066423 | A1 | 3/2009 | Sareen et al. |
| 2009/0125652 | A1* | 5/2009 | Huff .............................. 710/71 |
| 2009/0149149 | A1 | 6/2009 | Rujis |
| 2009/0237128 | A1 | 9/2009 | Qiao |
| 2010/0085086 | A1 | 4/2010 | Nedovic |
| 2010/0090723 | A1 | 4/2010 | Nedovic |
| 2010/0090733 | A1 | 4/2010 | Kristensson |
| 2010/0091925 | A1 | 4/2010 | Nedovic |
| 2010/0091927 | A1 | 4/2010 | Walker |
| 2010/0104057 | A1 | 4/2010 | Nedovic |
| 2010/0119024 | A1 | 5/2010 | Shumarayev et al. |
| 2010/0241918 | A1 | 9/2010 | Nedovic |

OTHER PUBLICATIONS

Von Bueren, George et al, "5.75 to 44Gb/s Quarter Rate CDR with Data Rate Selection in 90nm Bulk CMOS," 34th European Solid-State Circuits Conference, ESSCIRC, 2008.

Savoj, Jafar et al., "Design of Half-Rate Clock and Data Recovery Circuits for Optical Communication Systems," Proceedings of Design Automation Conference, 2001.

Dally, William et al., "Digital Systems Engineering," Cambridge University Press, Cambridge, UK, 2008.

Office Action for U.S. Appl. No. 12/511,352, filed Oct. 29, 2010.

Office Action for U.S. Appl. No. 12/510,211, filed Feb. 10, 2011.

SerDes Framer Interface Level 5 Phase 2 (SFI-5.2): Implementation Agreement for *40Gb/s* Interface for Physical Layer Devices, IA# OIF-SFI5-02.0, Oct. 2, 2006.

Hanumolu, P. K. et al., "A Wide-Tracking Range Clock and Data Recovery Circuit", *IEEE JSSC*, 43:2, Feb. 2008.

Lee, J. et al., "A 40-Gb/s Clock and Data Recovery Circuit in O.18-/-tm CMOS Technology", IEEE Journal of Solid-State Circuits, 38:12, Dec. 2003.

Nedovic, N. et al., "A 40-44Gb/s 3x Oversampling CMOS CDR /1: 16 DEMUX", ISSCC Digest of Technical Papers, 2007.

Staszewski, R. B. et al, "All-Digital TX Frequency Synthesizer and Discrete-Time Receiver for Bluetooth Radio in 130-nm CMOS", *IEEE JSSC*, 39:12, Dec. 2004.

Office Action for U.S. Appl. No. 12/510,211, filed Aug. 23, 2010.

Office Action for U.S. Appl. No. 12/511,340, filed Sep. 28, 2010.

Office Action for U.S. Appl. No. 12/511,365, filed Oct. 25, 2011.

Nedovic, N., U.S. Appl. No. 13/424,728, USPTO, Patent Application filed Mar. 20, 2012, *Symmetric Phase Detector*.

Nedovic, N., U.S. Appl. No. 12/510,211, USPTO, Amendment after non-final Office Action filed Dec. 2, 2010.

Nedovic, N., U.S. Appl. No. 12/510,211, USPTO, Notice of Appeal and Pre-Brief Appeal filed Jun. 8, 2011.

Nedovic, N., U.S. Appl. No. 12/510,211, USPTO, Appeal Brief filed Sep. 6, 2011.

Nedovic, N., U.S. Appl. No. 12/510,211, USPTO, Examiner's Answer to Appeal Brief dated Nov. 10, 2011.

Nedovic, N., U.S. Appl. No. 12/510,211, USPTO, Reply Brief filed Jan. 9, 2012.

Nedovic, N., U.S. Appl. No. 12/511,340, USPTO, Amendment after non-final Office Action filed Dec. 28, 2010.

Nedovic, N., U.S. Appl. No. 12/511,340, USPTO, Notice of Allowance dated Jan. 19, 2012.

Nedovic, N., U.S. Appl. No. 12/511,352, USPTO, Amendment after non-final Office Action filed Feb. 8, 2011.

Nedovic, N., U.S. Appl. No. 12/511,352, USPTO, Notice of Allowance dated Aug. 23, 2011.

Walker, W.., U.S. Appl. No. 12/511,365, USPTO, Amendment after non-final Office Action filed Jan. 20, 2012.

Walker, W., U.S. Appl. No. 12/511,365, USPTO, Supplemental Amendment to Office Action filed Mar. 5, 2012.

Walker, W., U.S. Appl. No. 12/511,365, USPTO, Non-final Office Action dated Mar. 29, 2012.

Nedovic, N., U.S. Appl. No. 13/424,728, USPTO, Non-final Office Action dated Apr. 26, 2012.

* cited by examiner

*FIG. 4B*

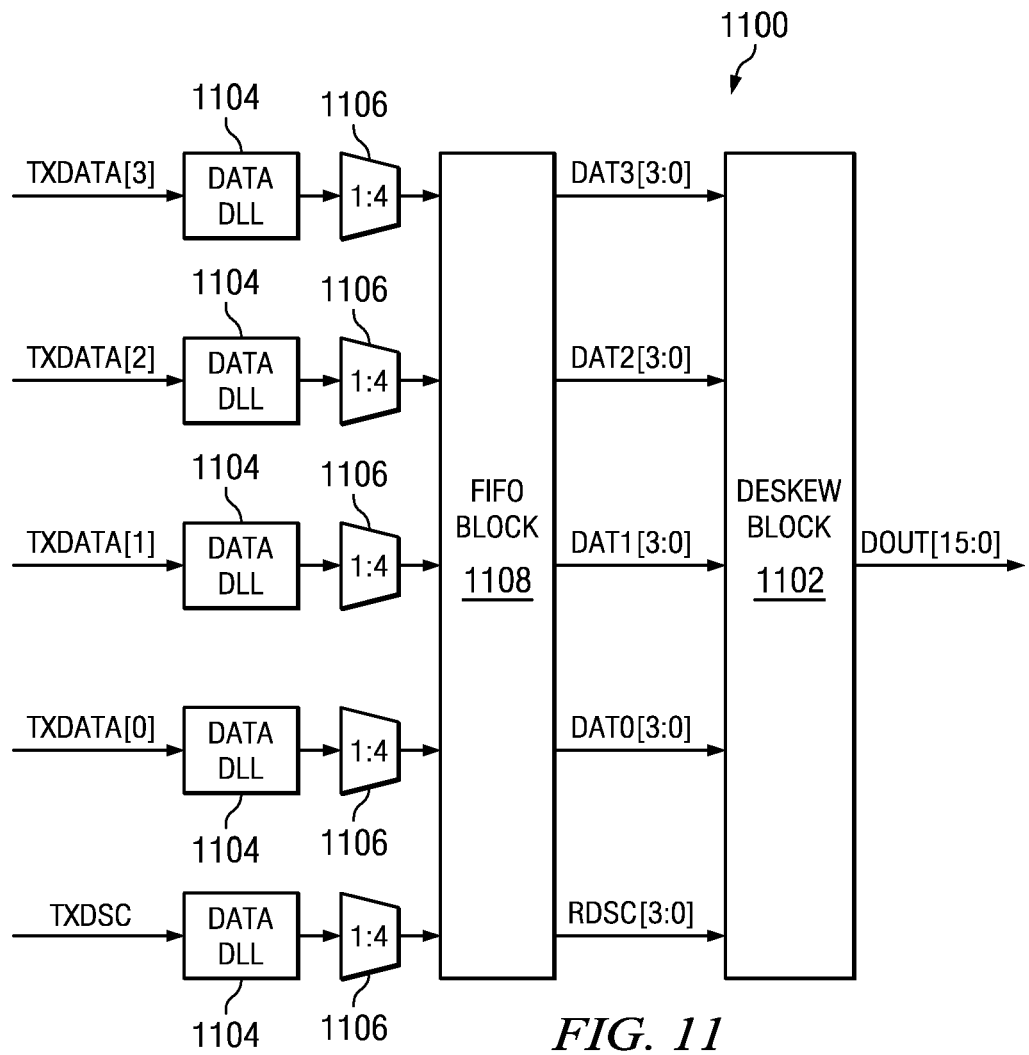

| BIT | DSCLT0 | DSCLT1 | DSCLT2 | DSCLT3 | DSCLT4 |
|---|---|---|---|---|---|
| 3 | CH2 | CH1 | CH0 | E | CH3 |
| 2 | CH1 | CH0 | O | CH3 | CH2 |
| 1 | CH0 | E | CH3 | CH2 | CH1 |
| 0 | O | CH3 | CH2 | CH1 | CH0 |

*FIG. 16A*

| BIT | DSCLT0 | DSCLT1 | DSCLT2 | DSCLT3 | DSCLT4 |
|---|---|---|---|---|---|
| 3 | CH2 | CH1 | CH0 | O | CH3 |
| 2 | CH1 | CH0 | E | CH3 | CH2 |
| 1 | CH0 | O | CH3 | CH2 | CH1 |
| 0 | E | CH3 | CH2 | CH1 | CH0 |

*FIG. 16B*

| DIFFERENCE IN UI | DSCLT6[3] | DSCLT5[2] | DSCLT4[1] | DSCLT3[0] | OUTPUT |
|---|---|---|---|---|---|
| -7 | DAT3LT8[3] | DAT3LT7[2] | DAT3LT6[1] | DAT3LT5[0] | C3MCH0[14] |
| -6 | DAT3LT8[2] | DAT3LT7[1] | DAT3LT6[0] | DAT3LT4[3] | C3MCH0[13] |
| -5 | DAT3LT8[1] | DAT3LT7[0] | DAT3LT5[3] | DAT3LT4[2] | C3MCH0[12] |
| -4 | DAT3LT8[0] | DAT3LT6[3] | DAT3LT5[2] | DAT3LT4[1] | C3MCH0[11] |
| -3 | DAT3LT7[3] | DAT3LT6[2] | DAT3LT5[1] | DAT3LT4[0] | C3MCH0[10] |
| -2 | DAT3LT7[2] | DAT3LT6[1] | DAT3LT5[0] | DAT3LT3[3] | C3MCH0[9] |
| -1 | DAT3LT7[1] | DAT3LT6[0] | DAT3LT4[3] | DAT3LT3[2] | C3MCH0[8] |
| 0 | DAT3LT7[0] | DAT3LT5[3] | DAT3LT4[2] | DAT3LT3[1] | C3MCH0[7] |
| +1 | DAT3LT6[3] | DAT3LT5[2] | DAT3LT4[1] | DAT3LT3[0] | C3MCH0[6] |
| +2 | DAT3LT6[2] | DAT3LT5[1] | DAT3LT4[0] | DAT3LT2[3] | C3MCH0[5] |
| +3 | DAT3LT6[1] | DAT3LT5[0] | DAT3LT3[3] | DAT3LT2[2] | C3MCH0[4] |
| +4 | DAT3LT6[0] | DAT3LT4[3] | DAT3LT3[2] | DAT3LT2[1] | C3MCH0[3] |
| +5 | DAT3LT5[3] | DAT3LT4[2] | DAT3LT3[1] | DAT3LT2[0] | C3MCH0[2] |
| +6 | DAT3LT5[2] | DAT3LT4[1] | DAT3LT3[0] | DAT3LT1[3] | C3MCH0[1] |
| +7 | DAT3LT5[1] | DAT3LT4[0] | DAT3LT2[3] | DAT3LT1[2] | C3MCH0[0] |

*FIG. 20A*

| DIFFERENCE IN UI | DSCLT6[2] | DSCLT5[1] | DSCLT4[0] | DSCLT2[3] | OUTPUT |
|---|---|---|---|---|---|
| -7 | DAT2LT8[2] | DAT2LT7[1] | DAT2LT6[0] | DAT2LT4[3] | C2MCH0[14] |
| -6 | DAT2LT8[1] | DAT2LT7[0] | DAT2LT5[3] | DAT2LT4[2] | C2MCH0[13] |
| -5 | DAT2LT8[0] | DAT2LT6[3] | DAT2LT5[2] | DAT2LT4[1] | C2MCH0[12] |
| -4 | DAT2LT7[3] | DAT2LT6[2] | DAT2LT5[1] | DAT2LT4[0] | C2MCH0[11] |
| -3 | DAT2LT7[2] | DAT2LT6[1] | DAT2LT5[0] | DAT2LT3[3] | C2MCH0[10] |
| -2 | DAT2LT7[1] | DAT2LT6[0] | DAT2LT4[3] | DAT2LT3[2] | C2MCH0[9] |
| -1 | DAT2LT7[0] | DAT2LT5[3] | DAT2LT4[2] | DAT2LT3[1] | C2MCH0[8] |
| 0 | DAT2LT6[3] | DAT2LT5[2] | DAT2LT4[1] | DAT2LT3[0] | C2MCH0[7] |
| +1 | DAT2LT6[2] | DAT2LT5[1] | DAT2LT4[0] | DAT2LT2[3] | C2MCH0[6] |
| +2 | DAT2LT6[1] | DAT2LT5[0] | DAT2LT3[3] | DAT2LT2[2] | C2MCH0[5] |
| +3 | DAT2LT6[0] | DAT2LT4[3] | DAT2LT3[2] | DAT2LT2[1] | C2MCH0[4] |
| +4 | DAT2LT5[3] | DAT2LT4[2] | DAT2LT3[1] | DAT2LT2[0] | C2MCH0[3] |
| +5 | DAT2LT5[2] | DAT2LT4[1] | DAT2LT3[0] | DAT2LT1[3] | C2MCH0[2] |
| +6 | DAT2LT5[1] | DAT2LT4[0] | DAT2LT2[3] | DAT2LT1[2] | C2MCH0[1] |
| +7 | DAT2LT5[0] | DAT2LT3[3] | DAT2LT2[2] | DAT2LT1[1] | C2MCH0[0] |

*FIG. 20B*

| DIFFERENCE IN UI | DSCLT6[1] | DSCLT5[0] | DSCLT3[3] | DSCLT2[2] | OUTPUT |
|---|---|---|---|---|---|
| -7 | DAT1LT8[1] | DAT1LT7[0] | DAT1LT5[3] | DAT1LT4[2] | C1MCH0[14] |
| -6 | DAT1LT8[0] | DAT1LT6[3] | DAT1LT5[2] | DAT1LT4[1] | C1MCH0[13] |
| -5 | DAT1LT7[3] | DAT1LT6[2] | DAT1LT5[1] | DAT1LT4[0] | C1MCH0[12] |
| -4 | DAT1LT7[2] | DAT1LT6[1] | DAT1LT5[0] | DAT1LT3[3] | C1MCH0[11] |
| -3 | DAT1LT7[1] | DAT1LT6[0] | DAT1LT4[3] | DAT1LT3[2] | C1MCH0[10] |
| -2 | DAT1LT7[0] | DAT1LT5[3] | DAT1LT4[2] | DAT1LT3[1] | C1MCH0[9] |
| -1 | DAT1LT6[3] | DAT1LT5[2] | DAT1LT4[1] | DAT1LT3[0] | C1MCH0[8] |
| 0 | DAT1LT6[2] | DAT1LT5[1] | DAT1LT4[0] | DAT1LT2[3] | C1MCH0[7] |
| +1 | DAT1LT6[1] | DAT1LT5[0] | DAT1LT3[3] | DAT1LT2[2] | C1MCH0[6] |
| +2 | DAT1LT6[0] | DAT1LT4[3] | DAT1LT3[2] | DAT1LT2[1] | C1MCH0[5] |
| +3 | DAT1LT5[3] | DAT1LT4[2] | DAT1LT3[1] | DAT1LT2[0] | C1MCH0[4] |
| +4 | DAT1LT5[2] | DAT1LT4[1] | DAT1LT3[0] | DAT1LT1[3] | C1MCH0[3] |
| +5 | DAT1LT5[1] | DAT1LT4[0] | DAT1LT2[3] | DAT1LT1[2] | C1MCH0[2] |
| +6 | DAT1LT5[0] | DAT1LT3[3] | DAT1LT2[2] | DAT1LT1[1] | C1MCH0[1] |
| +7 | DAT1LT4[3] | DAT1LT3[2] | DAT1LT2[1] | DAT1LT1[0] | C1MCH0[0] |

*FIG. 20C*

| DIFFERENCE IN UI | DSCLT6[0] | DSCLT4[3] | DSCLT3[2] | DSCLT2[1] | OUTPUT |
|---|---|---|---|---|---|
| -7 | DAT0LT8[0] | DAT0LT6[3] | DAT0LT5[2] | DAT0LT4[1] | C0MCH0[14] |
| -6 | DAT0LT7[3] | DAT0LT6[2] | DAT0LT5[1] | DAT0LT4[0] | C0MCH0[13] |
| -5 | DAT0LT7[2] | DAT0LT6[1] | DAT0LT5[0] | DAT0LT3[3] | C0MCH0[12] |
| -4 | DAT0LT7[1] | DAT0LT6[0] | DAT0LT4[3] | DAT0LT3[2] | C0MCH0[11] |
| -3 | DAT0LT7[0] | DAT0LT5[3] | DAT0LT4[2] | DAT0LT3[1] | C0MCH0[10] |
| -2 | DAT0LT6[3] | DAT0LT5[2] | DAT0LT4[1] | DAT0LT3[0] | C0MCH0[9] |
| -1 | DAT0LT6[2] | DAT0LT5[1] | DAT0LT4[0] | DAT0LT2[3] | C0MCH0[8] |
| 0 | DAT0LT6[1] | DAT0LT5[0] | DAT0LT3[3] | DAT0LT2[2] | C0MCH0[7] |
| +1 | DAT0LT6[0] | DAT0LT4[3] | DAT0LT3[2] | DAT0LT2[1] | C0MCH0[6] |
| +2 | DAT0LT5[3] | DAT0LT4[2] | DAT0LT3[1] | DAT0LT2[0] | C0MCH0[5] |
| +3 | DAT0LT5[2] | DAT0LT4[1] | DAT0LT3[0] | DAT0LT1[3] | C0MCH0[4] |
| +4 | DAT0LT5[1] | DAT0LT4[0] | DAT0LT2[3] | DAT0LT1[2] | C0MCH0[3] |
| +5 | DAT0LT5[0] | DAT0LT3[3] | DAT0LT2[2] | DAT0LT1[1] | C0MCH0[2] |
| +6 | DAT0LT4[3] | DAT0LT3[2] | DAT0LT2[1] | DAT0LT1[0] | C0MCH0[1] |
| +7 | DAT0LT4[2] | DAT0LT3[1] | DAT0LT2[0] | DAT0LT0[3] | C0MCH0[0] |

PARALLEL GENERATION AND MATCHING OF A DESKEW CHANNEL

RELATED APPLICATION

This application claims the benefit, under 35 U.S.C. §119(e), of U.S. Provisional Patent Application No. 61/084,512, entitled Parallel Generation and Matching of a deskew channel, filed 29 Jul. 2008.

TECHNICAL FIELD

The present disclosure relates generally to signal communication.

BACKGROUND

A typical line interface of a communication system with optical links generally includes three devices: an optical module that includes a serializer/deserializer (serdes) component, a forward error correction (FEC) processor, and a framer. The interconnection between these devices is electrical and the maximum data rate per signal is typically less than the optical data rate. Thus, a multi-bit bus is generally required.

BRIEF DESCRIPTION OF THE DRAWINGS

FIGS. 4A and 4B illustrate example bit relationships between a number of signals illustrated in FIG. 1.

FIG. 11 illustrates an example circuit that includes a deskew block.

FIGS. 13A and 13B illustrate example frame matching patterns.

FIGS. 16A and 16B illustrate example frame matching patterns including signal and timing information.

FIGS. 20A, 20B, 20C, and 20D illustrate comparisons that may be made to align data channels relative to a deskew channel.

DESCRIPTION OF EXAMPLE EMBODIMENTS

Particular embodiments relate to a deskew channel generator suitable for use in a 40 Gb/s deserializer. In particular embodiments, the deserializer is a CMOS clock and data recovery (CDR) and 1:4 deserializer. In particular embodiments, the deserializer receives as input a 40 Gb/s differential input data signal or two 20 Gb/s differential input data signals and outputs four 4-bit data signals at 10 GHz as well as a deskew channel signal for later use in aligning the data bits in the four 4-bit data signals. In particular embodiments, the deserializer is a SFI5.2 compliant digital CMOS deserializer having reduced power consumption compared to, by way of example, conventional SiGe integrated circuits (ICs).

Particular embodiments relate to a deskew block suitable for use in a 40 Gb/s serializer. In particular embodiments, the serializer receives as input four 4-bit data signals at 10 GHz and a deskew channel at 10 Gb/s, removes skew and/or wander in the four data channels, and outputs either two data channels at 20 Gb/s or one data channel at 40 Gb/s. In particular embodiments, the serializer is a SFI5.2 compliant digital CMOS serializer having reduced power consumption compared to, by way of example, conventional SiGe integrated circuits (ICs). In particular embodiments, the output of the serializer is transmitted to a DQPSK (Differential Quadrature PhaseShift Keying) modulator.

In particular embodiments, all signals or streams described below are differential streams, where appropriate.

Figure 1:
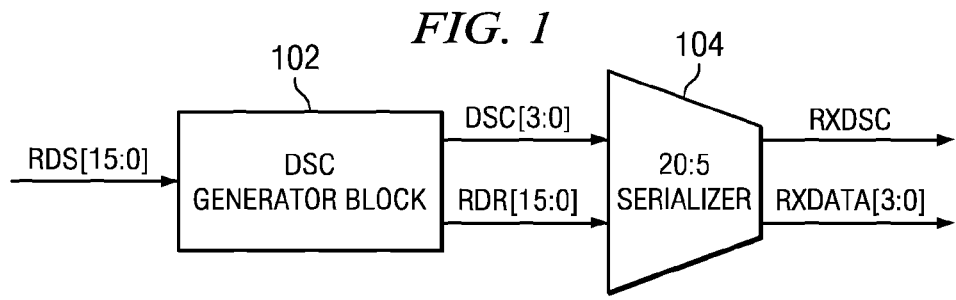
FIG. 1 illustrates an example circuit that includes a deskew channel (DSC) generator block.
Figure 2:
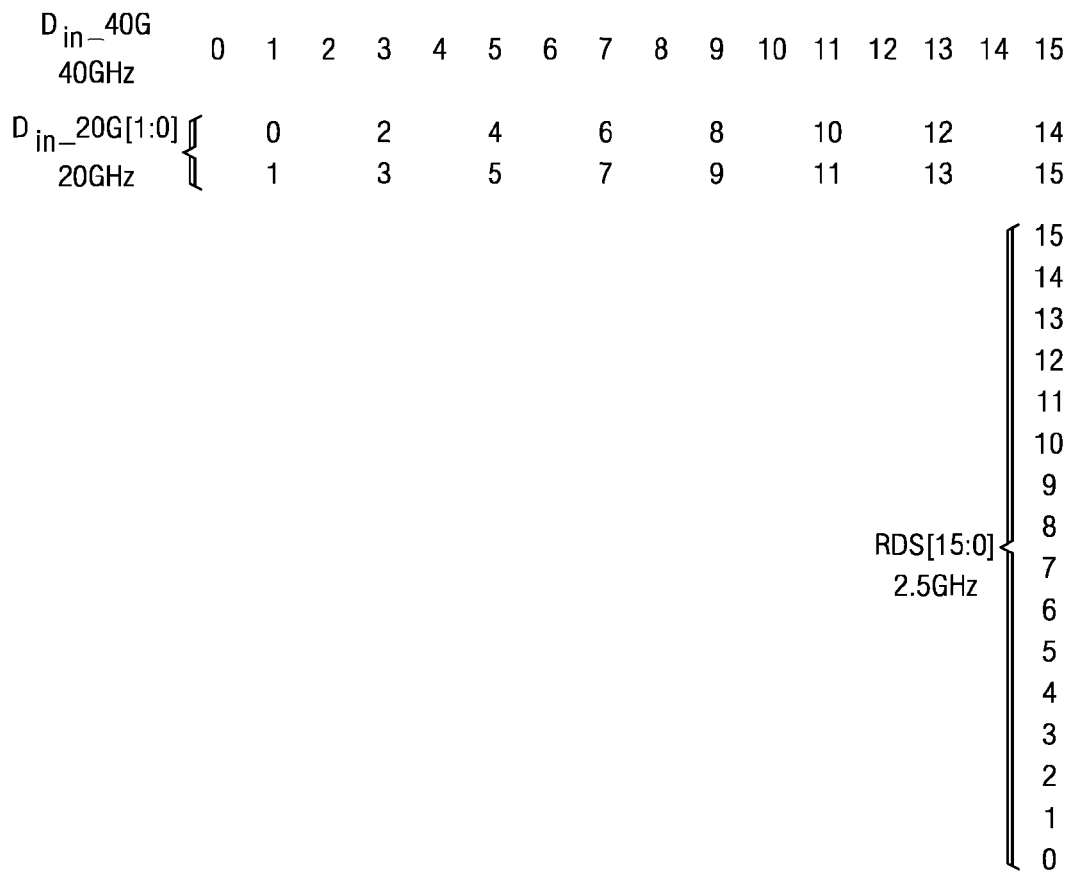
FIG. 2 illustrates an example ordering of bits input to the circuit of FIG. 1.

FIG. 1 illustrates an example circuit or system 100 that includes a deskew channel (DSC) generator block 102. In particular embodiments, DSC generator block 102 receives as input a 16-bit recovered input data bit signal RDS[15:0] at 2.5 GHz (e.g., 16 parallel streams at 2.5 Gb/s each). In particular embodiments, each span of 16 bits in RDS[15:0] (per 2.5 GHz clock cycle) is referred to as a data word. By way of example, RDS[15:0] may be recovered from either one 40 Gb/s serial input data signal $D_{in\_}40\,G$ or a 2-bit input data signal $D_{in\_}20\,G$ at 20 GHz. The ordering of the bits in RDS[15:0] relative to $D_{in\_}40\,G$ or $D_{in\_}20\,G$ may be, for didactic purposes, as illustrated in FIG. 2. In the illustrated embodiment, bit 15 is the earliest in time and bit 0 is the latest in time. In particular embodiments, DSC generator block 102 outputs a 4-bit deskew channel (or signal) DSC[3:0] at 2.5 GHz as well as a 16-bit recovered data bit signal RDR[15:0] at 2.5 GHz. In particular embodiments, DSC generator block 102 operates on all sixteen recovered streams within input data signal RDS[15:0] in parallel.

Figure 3:
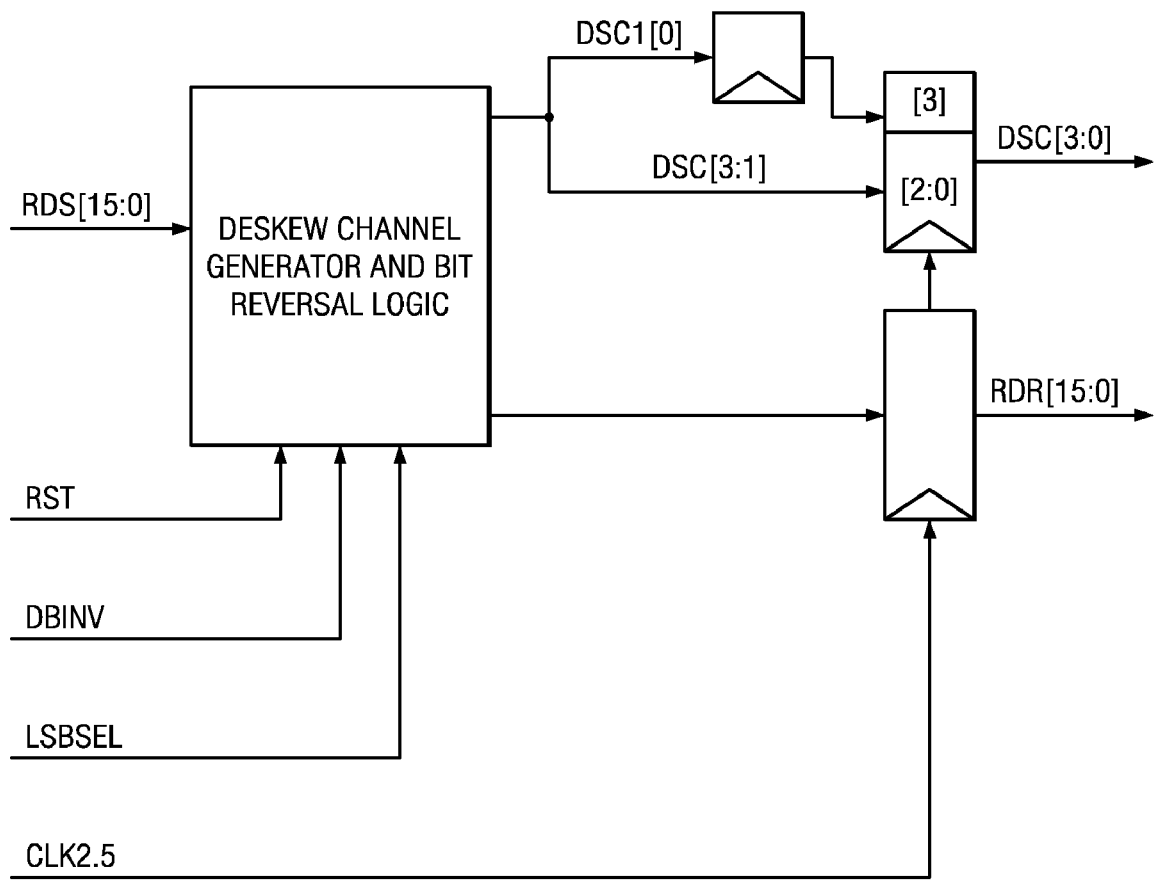
FIG. 3 illustrates an example DSC generator block.

FIG. 3 illustrates an example DSC generator block 102. In particular embodiments, DSC generator block 102 includes DSC generator logic and bit reversal logic. In particular embodiments, DSC generator block 102 receives as input RDS[15:0], a 2.5 GHz clock signal CLK2.5, and control signals RST, DBINV, and LSBSEL, and outputs 4-bit deskew signal DSC[3:0]. In the illustrated embodiment, DSC generator block 102 also outputs 16-bit data output signal RDR[15:0]. Depending on the control signal DBINV, bits in RDR[15:0] may be inverted as described in more detail below. In particular embodiments, the bits in DSC[3:0] are delayed by one unit interval (UI) at 10 Gb/s. In particular embodiments, the delay is taken into account by delaying the bits in DSC[3:0] by one bit after they have been generated.

As shown in the embodiment illustrated in FIG. 1, the signals DSC[3:0] and RDR[15:0] output from DSC generator block 102 may then be input to a 20:5 serializer 104. In particular embodiments, serializer 104 serializes or multiplexes the data bits in the 16-bit data signal RDR[15:0] into four 4-bit data signals (hereinafter also referred to as data channels) RXDATA[3], RXDATA[2], RXDATA[1], and RXDATA[0], collectively referred to as data signal RXDATA[3:0] at 10 Gb/s. In particular embodiments, serializer 104 also serializes or multiplexes DSC[3:0] into a serial signal RXDSC at 10 Gb/s.

In particular embodiments, the bits in DSC[3:0] are organized or grouped into frames. In one particular embodiment, each frame spans ten 4-bit data transfers (e.g., ten 2.5 GHz clock cycles of data corresponding to 2.5 data words). In one embodiment, each frame is further divided into two sections referred to as nibbles. Each nibble, therefore, spans five 4-bit data transfers. As described in more detail below, each nibble is either an even or an odd nibble depending if the corresponding DSC bit is based on an even or an odd parity. When the control signal DBINV is enabled (when DBINV=1), the data in the odd nibbles is inverted. In a particular embodiment, the inversion is performed before DSC[3:0] is generated. In this manner, the inverted data is used in the calculation of the corresponding odd parity bit.

Figure 4A:
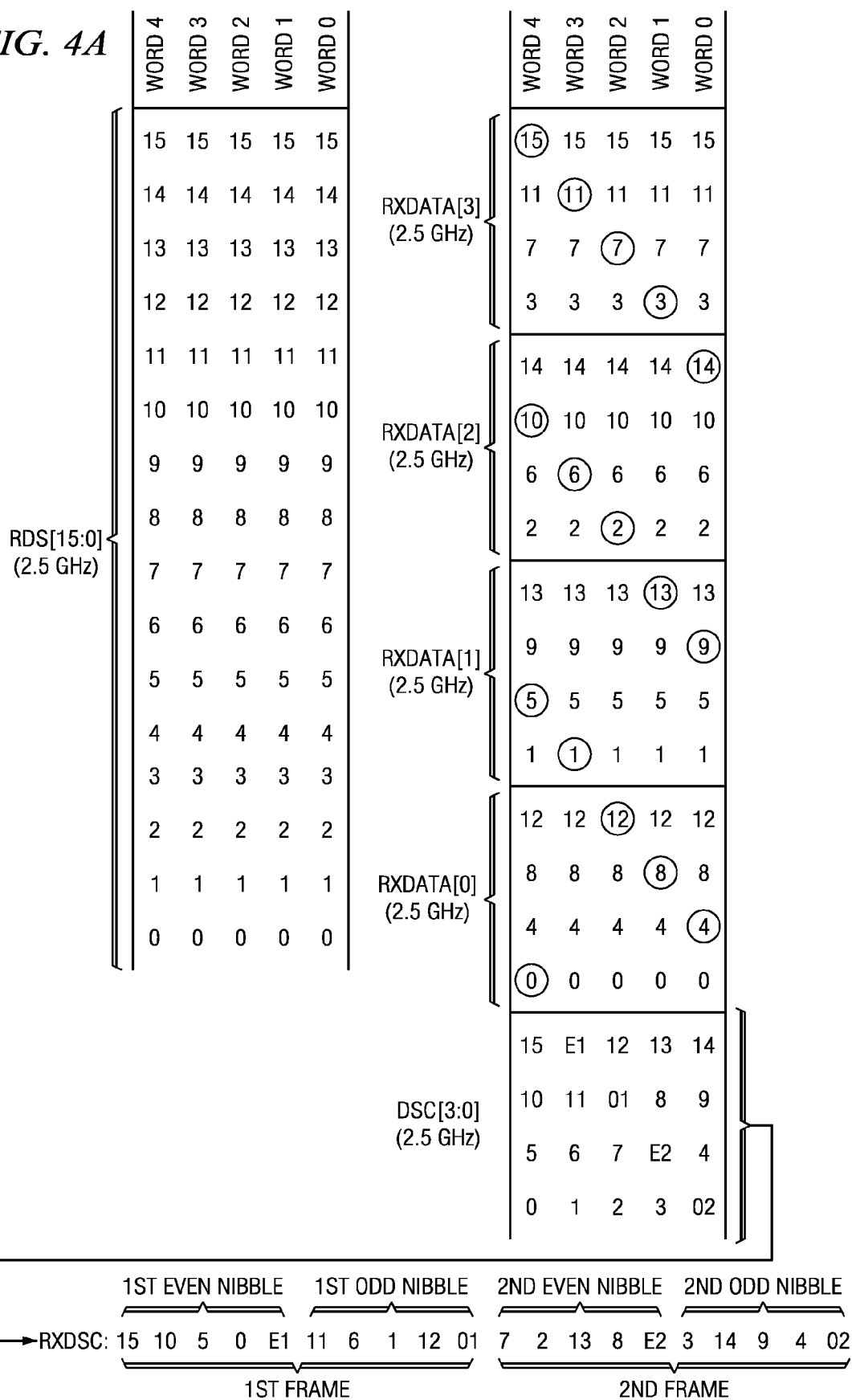
Figure 4B:
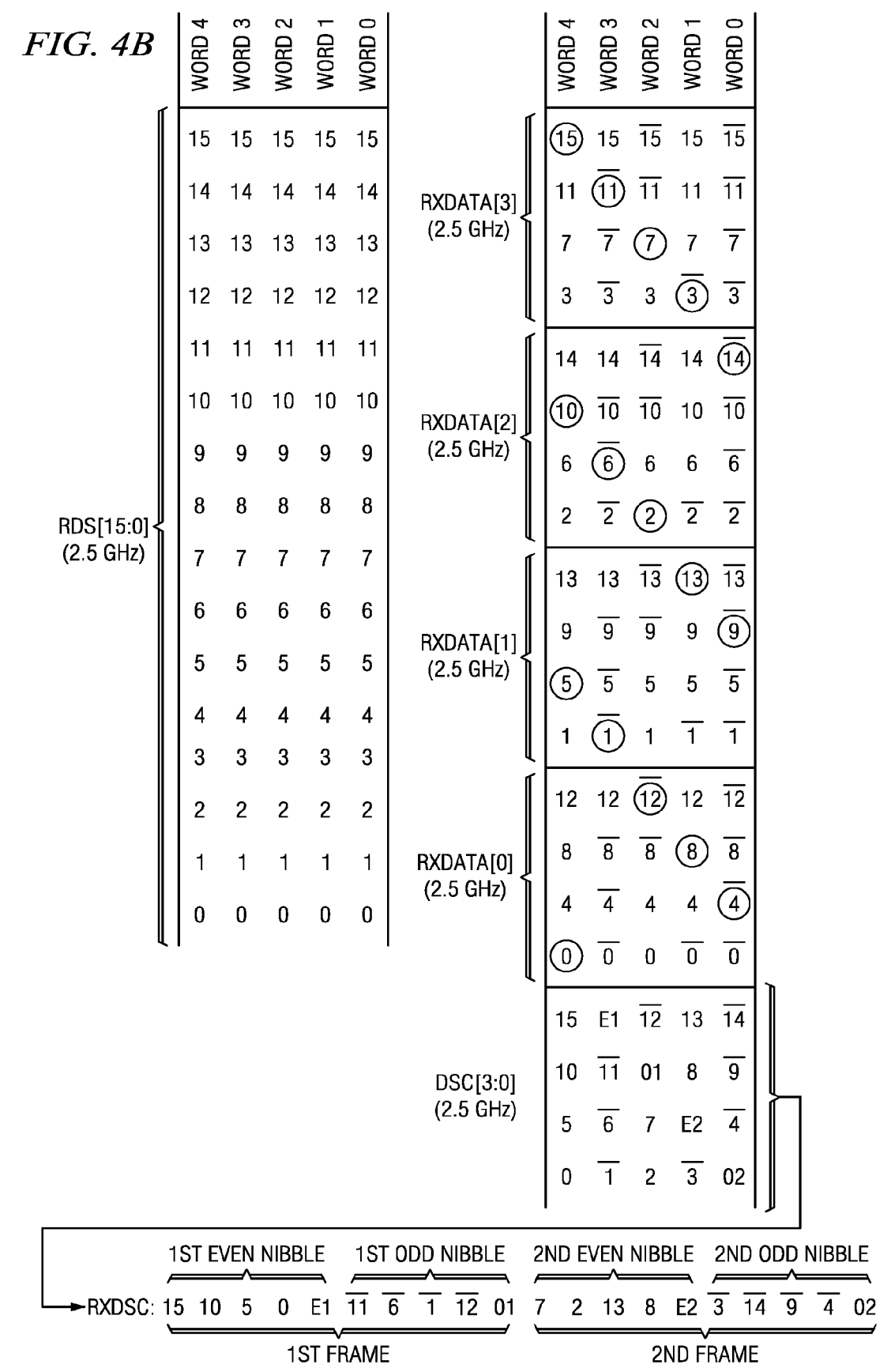

FIGS. 4A and 4B illustrate the bit relationships between RDS[15:0], RXDATA[3], RXDATA[2], RXDATA[1], RXDATA[0], DSC[3:0], and RXDSC over five words: WORD4, WORD3, WORD2, WORD1, and WORD0. In particular embodiments, since the input data RDS[15:0] is received in sixteen signals at 2.5 Gb/s each, the deskew channel signal DSC[3:0] is generated using 16-bit words at 2.5 GHz. Since each frame spans 40 bits (20 bits per nibble), the DSC generation spans multiple 16-bit words. By way of example, the minimum common multiple between 16 and 40 is 80. Therefore, the DSC generation spans y 16-bit words, where y=80÷16=5, and produces two frames [per DSC generation cycle].

In particular, FIG. 4A illustrates how the 16-bit words are multiplexed by serializer 104 into four 4-bit data signals RXDATA[3:0] when DBINV is not enabled (e.g., when DBINV=0) while FIG. 4B illustrates how the 16-bit words are multiplexed into four 4-bit data signals RXDATA[3:0] when DBINV is enabled (e.g., when DBINV=1). In FIG. 4B, the inverted bits are illustrated with an overline. As described above, each of FIGS. 4A and 4B span five 16-bit words from RDS[15:0]. In the illustrated embodiment, by convention, WORD4 and bit 15 are the earliest in time.

FIG. 4A also illustrates how bits in the five 16-bit input data words are selected for generating the deskew channel DSC[3:0] when DBINV is not enabled, while FIG. 4B illustrates how bits in the five 16-bit input data words are selected for generating the deskew channel DSC[3:0] when DBINV is enabled. The bits used to generate DSC[3:0] are circled in the corresponding data signals RXDATA[3:0]. In FIG. 4B, the inverted bits are illustrated with an overline. In particular embodiments, the bits in DSC[3:0] are generated in groups of four at 2.5 GHz to match the rate of the data bits. As described above, the sequences in FIGS. 4A- and 4B are repeated every five words.

Figure 5:
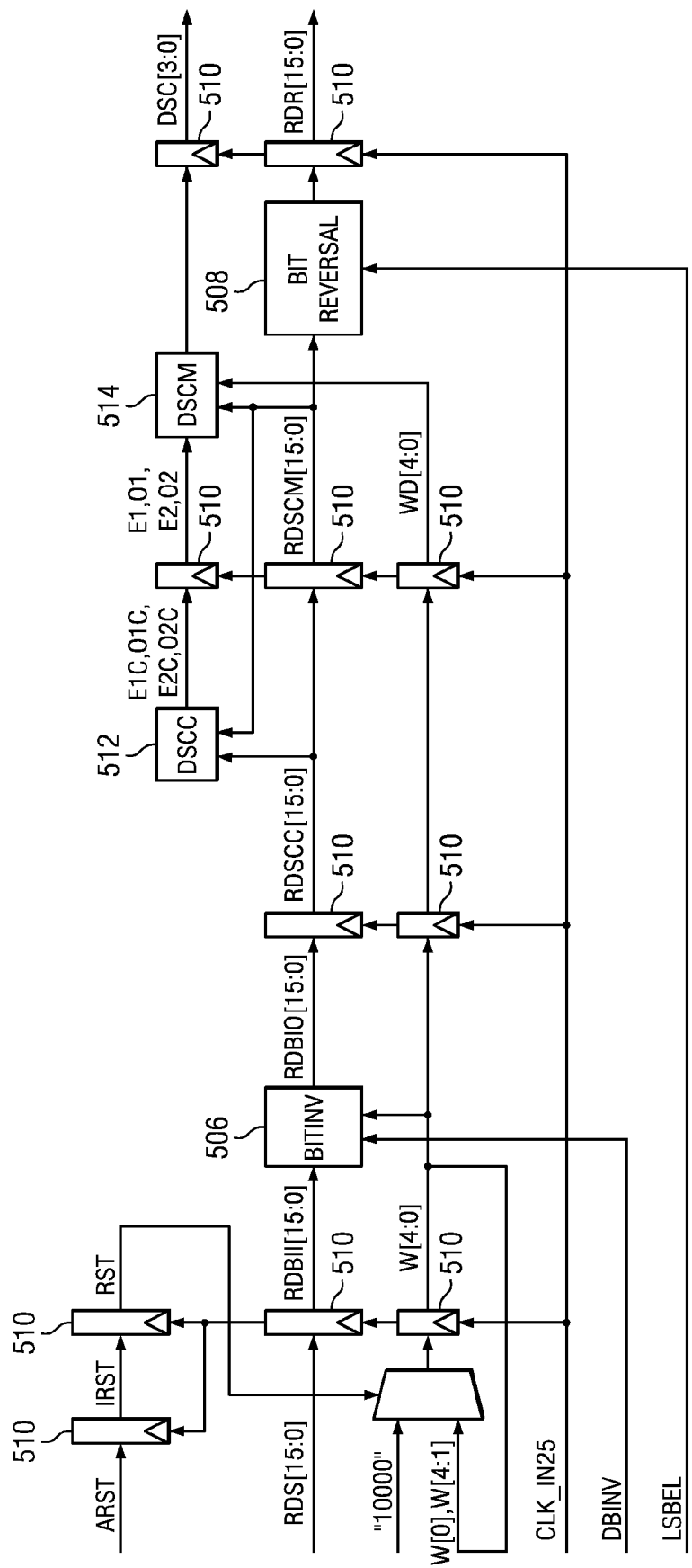
FIG. 5 illustrates a block diagram of example DSC generation and bit reversal logic.

FIG. 5 illustrates a block diagram of example DSC generation and bit reversal logic suitable for use in an example embodiment of the DSC generator block 102 of FIG. 4. In the illustrated embodiment, DSC generator block 102 includes a bit inversion (bitInv) block 506, a bit reversal block 508, and a number of clock elements 510 that, in the illustrated embodiment, are implemented as flip-flops. For didactic purposes, the logic may be essentially divided into three stages. By way of example, the first stage may perform the bit inversion while the last two perform the deskew channel generation. The last stage may also be used to delay DSC[3:0] by one 10 Gb/s UI (e.g., one bit) relative to the data. In particular, since the 4 bits of DSC[3:0] each clock cycle are generated in parallel synchronous to the 16-bit data, bit 0 is delayed by one cycle and becomes DSC[3] while bits [3:1] become DSC[2:0]. However, it should be appreciated that, depending on the complexity of each stage as well as the process performance, the number of stages may be reduced.

In one embodiment, the operation of DSC generator block 102 is controlled by a 5-bit register W[4:0] that indicates which data word is being processed. During reset (RST=1), W[4:0] may be initialized to "10000." Subsequently, W[4:0] may be rotated right in each cycle as shown in FIG. 5. The control register W[4:0] may be passed with the data along the logic. In a particular embodiment, the DSC generation logic must be split into at least two stages since bits from two consecutive data words may be required to calculate the even and odd parity bits E1, O1, E2, and O2.

Figure 6:
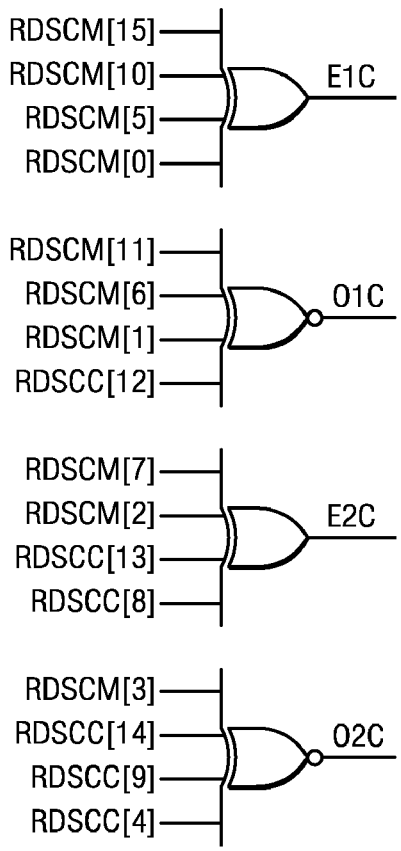
FIG. 6 illustrates example logic in a DSCC block.
Figure 8:
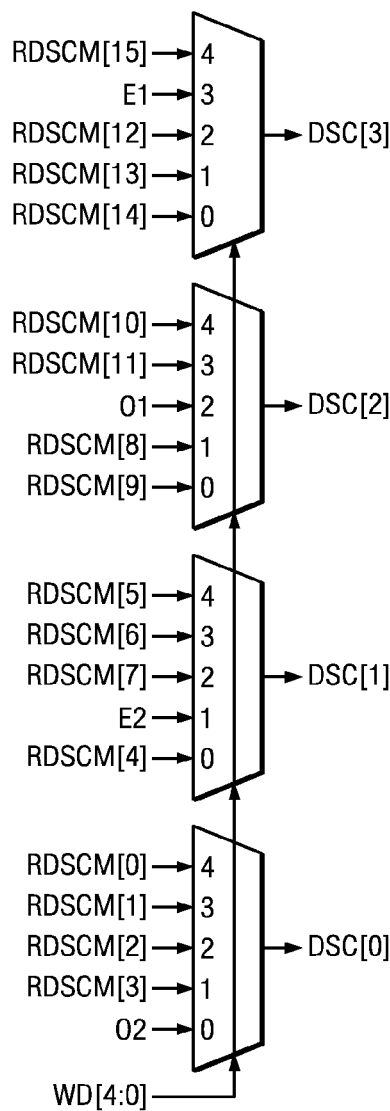
FIG. 8 illustrates example logic in a DSCM block.

FIG. 6 illustrates example logic in DSCC block 512. DSCC block 512 calculates and generates the even and odd parity bits E1, O1, E2, and O2 described above based on two consecutive words (RDSCM and RDSCC). FIG. 8 illustrates example logic in DSCM block 514. DSCM block 514 generates DSC[3:0] based on RDSCM[15:0] and the even and odd parity bits E1, O1, E2, and O2 as illustrated in FIGS. 4A and 4B.

Figure 7:
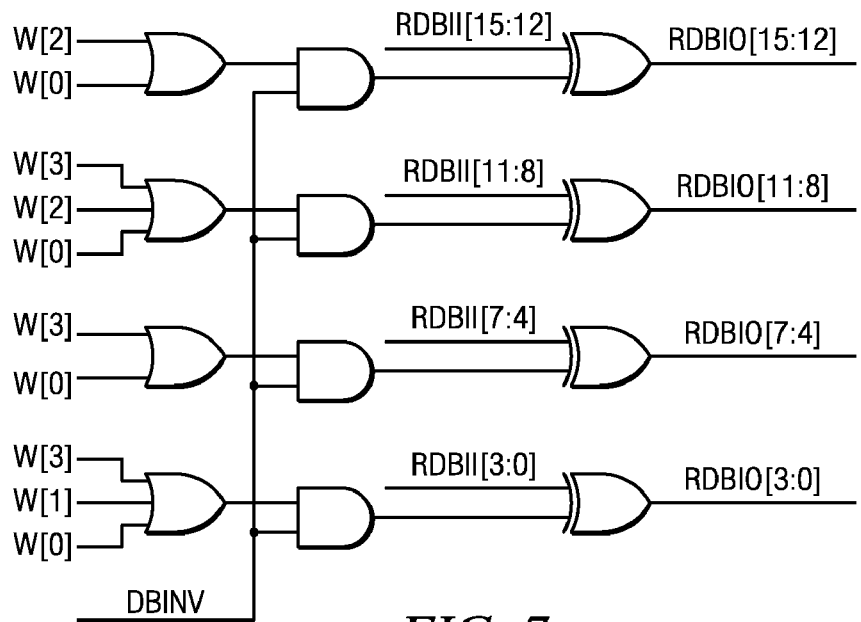
FIG. 7 illustrates example logic in a bitInv block.

In particular embodiments, DSC generator block 102 supports a selectable feature to overcome the problem of long consecutive identical digits (CID) that may occur for certain applications when distributed over four lines. In such particular embodiments, the bits of the five data nibbles used for the odd parity are inverted for all four data lines, as described in more detail above. In such cases, the inverted bits are included in the deskew signal DSC[3:0] and are used to generate the odd parity bits. FIG. 7 illustrates example logic in bitInv block 506.

Figure 9:
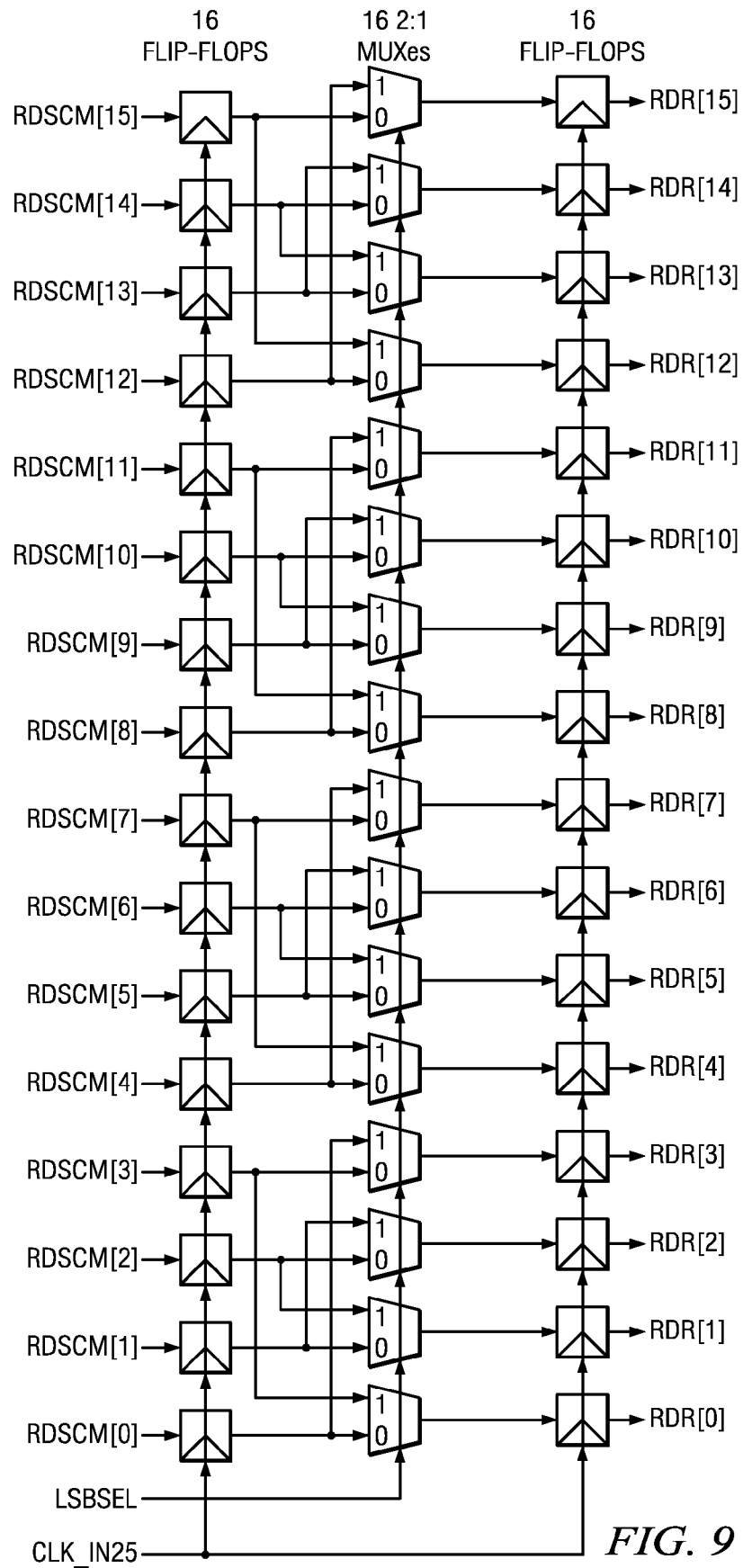
FIG. 9 illustrates example logic in a bit reversal block.

The bit reversal block 508 reverses the bits within the 4-bit fields in RDS[15:0], when configuration register (external control) bit LSBSEL=1. The LSBSEL signal, when enabled (e.g., LSBSEL=1), causes the MSB and LSB in DATA[3:0] to be reversed after these bits are used to generate DSC[3:0]. By way of example, RDS[15:12] would convert to RDR[12:15], RDS[11:8] would convert to RDR[8:11], and so on. Generally, when LSBSEL=1, RXDATA[3:0] becomes RXDATA[0:3]. FIG. 9 illustrates example logic in bit reversal block 508.

Figure 10:
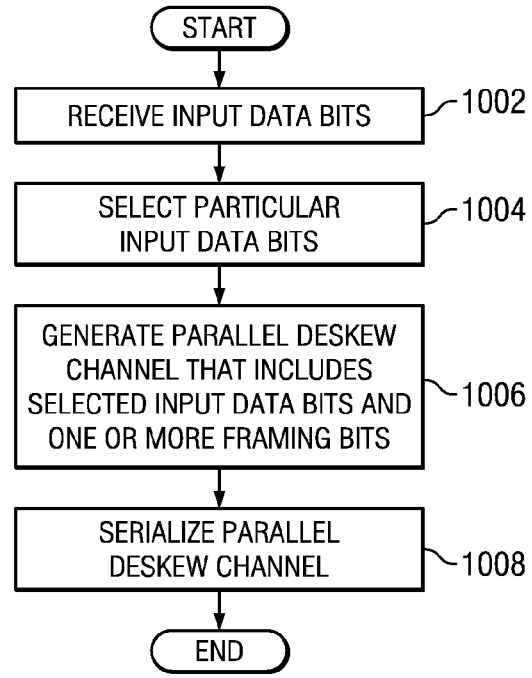
FIG. 10 shows a flow chart illustrating an example method for generating a deskew channel.

FIG. 10 shows a flowchart illustrating an example method for generating a deskew channel. In particular embodiments, the method of FIG. 10 is performed entirely with digital CMOS technology. At 1002, input data bits are received at a collective data rate. The input data bits may be grouped into a plurality of input data words and the input data bits of each of the input data words may be received from n parallel input data bit streams, each of the input data words including n consecutive ones of the input data bits. By way of example, in a particular embodiment, n is 16. Each of the n parallel input data bit streams may have a stream data rate that is 1/n of the collective data rate. In particular embodiments, the n parallel input data bit streams are multiplexed into m l-bit parallel data channel signals (hereinafter channels). By way of example, in a particular embodiment, m is 4, and l is 1. At 1004, particular input data bits are selected from the n parallel input data bit streams. At 1006, a parallel k-bit deskew channel signal is generated with the selected input data bits. By way of example, in a particular embodiment k is 4. The deskew channel may generally include a number of frames of input data bits. Each frame may include x processed or unprocessed input data bits from one or more input data words as well as one or more framing bits. By way of example, in a particular embodiment x is 4. By way of example, the framing bits may include one or more even or odd parity bits. At 1008, the bits in the k-bit deskew channel signal may be multiplexed into a serial deskew channel signal having a deskew channel data rate equivalent to the channel data rate.

FIG. 11 illustrates an example of a circuit 1100 that includes a deskew block 1102. By way of example, circuit 1100 may be suitable for use in a serializer. In particular embodiments, circuit 1100 receives as input four differential 10 Gb/s data signals (hereinafter also referred to as data channels) TXDATA[3], TXDATA[2], TXDATA[1], and TXDATA[0], collectively referred to as TXDATA[3:0], as well as a deskew channel TXDSC. By way of example, the signals TXDATA[3:0] and TXDSC may be the signals RXDATA[3:0] and RXDSC described above, respectively, after transmission over one or more links. In particular embodiments, circuit 1100 includes five data-DLL (delay-locked-loop) blocks 1104 in combination with five 1:4 demultiplexer blocks 1106 that receive the four data signals TXDATA[3], TXDATA[2], TXDATA[1], and TXDATA[0] as well as the deskew channel TXDSC, respectively, as illustrated in FIG. 11. In particular embodiments, Data-DLL and demultiplexer blocks 1104 and 1106 perform clock and data recovery independently for their corresponding respective data signal or deskew channel input. In the illustrated embodiment, circuit 1100 further includes five short FIFO blocks (collectively FIFO block) 1108 that each receive a corresponding 4-bit demultiplexed signal and collectively output the five 4-bit output signals DAT3[3:0], DAT2[3:0], DAT1[3:0], DAT0[3:0], and RDSC[3:0] at 2.5 GHz for subsequent input to deskew block 1102.

Deskew block 1102 includes logic for removing skew between the data signals DAT3[3:0], DAT2[3:0], DAT1[3:0], and DAT0[3:0] using information coded within RDSC[3:0]. In an example embodiment, deskew block 1102 is configured to remove up to ±7 UIs of skew between the data signals. In particular embodiments, deskew block 1102 takes into account that the bits in DAT3[3:0], DAT2[3:0], DAT1[3:0], DAT0[3:0], and RDSC[3:0] are input to deskew block 1102 in groups of 4 per each 2.5 GHz clock cycle. In particular embodiments, there are three general phases or operations that deskew block 1102 completes. By way of example, in phase 1, deskew block 1102 identifies frame boundaries in RDSC[3:0]. In phase 2, the time difference in UIs between RDSC[3:0] and each of the data channels DAT3[3:0], DAT2[3:0], DAT1[3:0], and DAT0[3:0] is determined by matching bits in RDSC[3:0] with bits in the data channels DAT3[3:0], DAT2[3:0], DAT1[3:0], and DAT0[3:0]. In phase 3, data bits are multiplexed into an output signal DOUT[15:0] based on the time difference between RDSC[3:0] and the corresponding data channels DAT3[3:0], DAT2[3:0], DAT1[3:0], and DAT0[3:0]. During the operation, if ISBSEL2 (described below) is enabled, the data channels are reversed (e.g., TXDATA[3:0] becomes TXDATA[0:3]). Additionally, if DBINV2 is enabled the bits in the odd nibbles are inverted. If deskewEN is disabled, the deskew operation does not happen and the bits in the data channels DAT3[3:0], DAT2[3:0], DAT1[3:0], and DAT0[3:0] are forwarded straight to the output.

Figure 12:
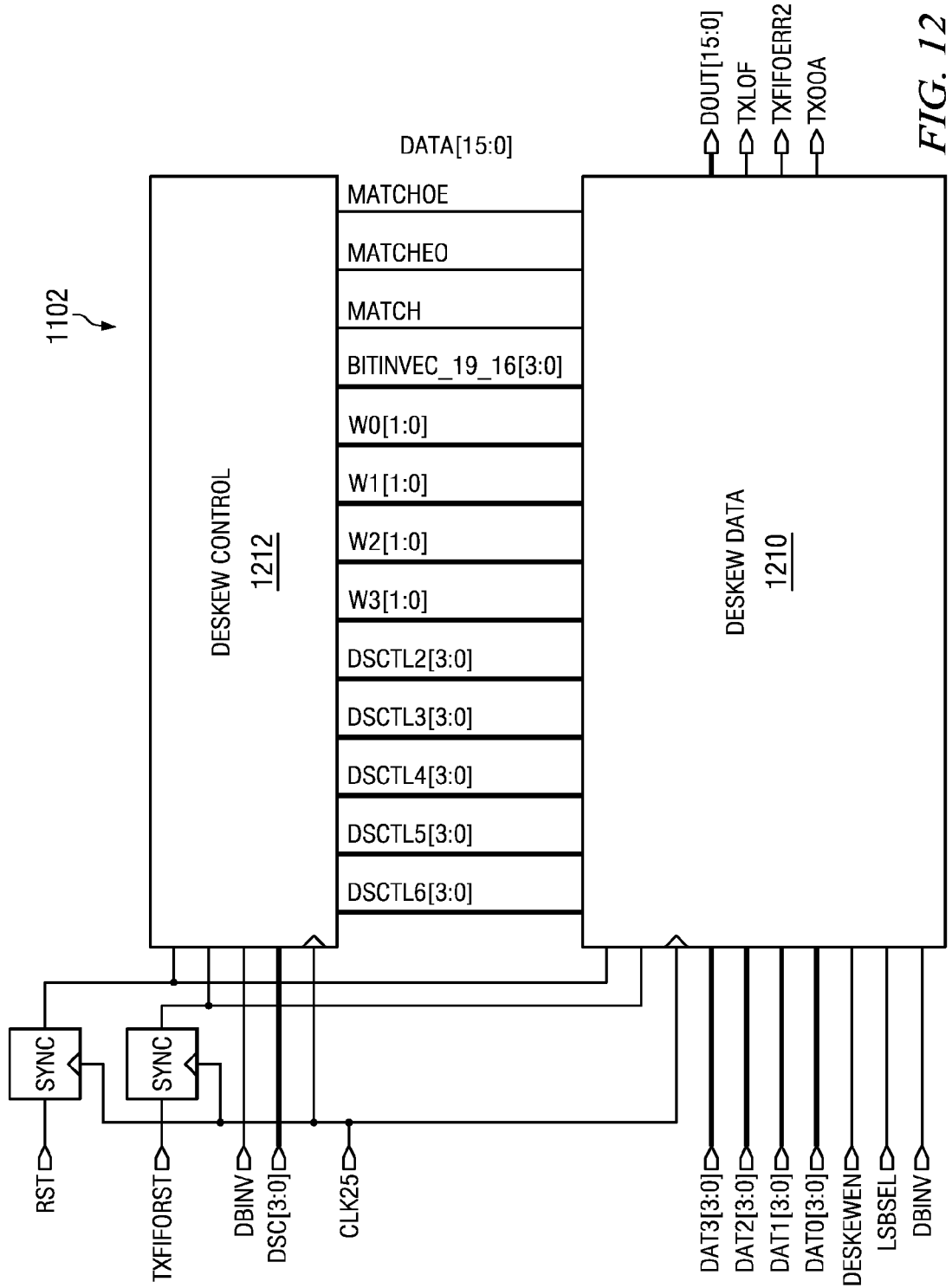
FIG. 12 illustrates a block diagram of example logic for a deskew block.

FIG. 12 illustrates a block diagram of example logic for deskew block 1102. In the illustrated embodiment, deskew block 1102 includes a deskew data block 1210 and a deskew control block 1212. Deskew block 1102 receives data channels DAT3[3:0], DAT2[3:0], DAT1[3:0], and DAT0[3:0], as well as control signal inputs deskewEN, ISBSEL2, and DBINV, and outputs a 16-bit output signal DOUT[15:0] at 2.5 GHz. Deskew control block 1212 receives as input RDSC[3:0] and control signal DBINV. Deskew data block 1210 and deskew control block 1212 are configured to communicate with each other via a number of channels, as illustrated in FIG. 12.

During the frame matching operation (of course it should be appreciated that this and any of the operations, methods, or process described herein may be performed on an ongoing and or concurrent basis with any other operation, method, or process, where appropriate), phase 1, deskew control block 1212 analyzes bits in RDSC[3:0]. Since the bits in RDSC[3:0] are input at a rate of 4 per 2.5 GHz clock cycle, and since one frame spans 10 bits (as described above with reference to FIGS. 4A and 4B), it is advantageous in particular embodiments to match two frames (i.e., 20 bits) at the same time with 20 being the minimum common multiple between 4 and 10. As illustrated in FIGS. 13A and 13B, there are two possible frame patterns that repeat every five data words or cycles based on the link delay: one with even nibbles followed by odd nibbles ("EO" pattern; FIG. 13A), and one with odd nibbles followed by even nibbles ("OE" pattern; FIG. 13B). In FIGS. 13A and 13B, "E" denotes an even parity bit, "O" denotes an odd parity bit, "CH3" denotes a bit corresponding to DAT3[3:0] (i.e., a bit whose match would have been multiplexed into RXDATA[3] in the deserializer), "CH2" denotes a bit corresponding to DAT2[3:0], "CH1" denotes a bit corresponding to DAT1[3:0], and "CH0" denotes a bit corresponding to DAT0[3:0]. As the skew between RDSC[3:0] and data channels DAT3[3:0], DAT2[3:0], DAT1[3:0], and DAT0[3:0] is not known, phase 1 involves determining frame boundaries using the patterns in FIGS. 13A and 13B. More particularly, deskew control block 1212 uses identified parity bits to determine where the boundaries of the received frames are.

Figure 14:
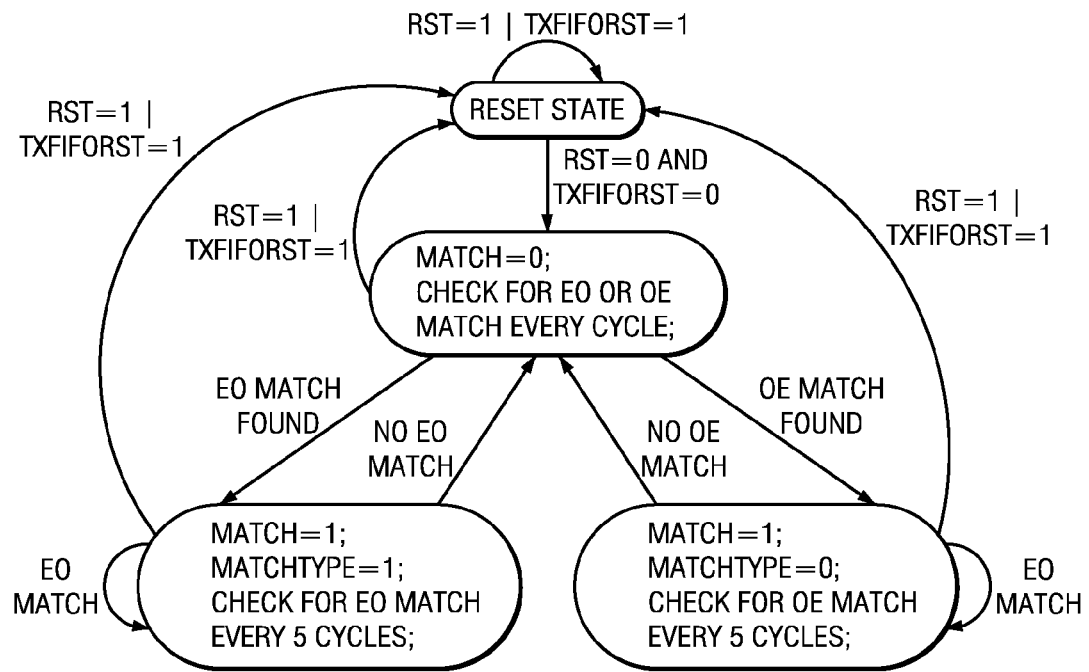
FIG. 14 shows a flow chart of a state machine that may be used to detect frames.
Figure 15:
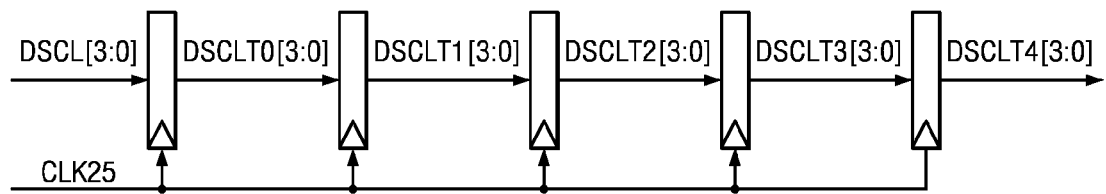
FIG. 15 illustrates a deskew register datapath.

FIG. 14 shows a flow chart of a state machine (e.g., incorporated into the logic of deskew block 1212) used to detect frames. If either RST or TXFIFORST is enabled (i.e., RST=1 or TXFIFORST=1), the state machine is in a reset state. When both RST and TXFIFORST are disabled (i.e., RST=0 and TXFIFORST=0), frame matches are attempted every clock cycle. When a match is found, MATCH is set to 1 and MATCHTYPE is set to 1 if an EO pattern was detected or 0 if an OE pattern was detected. Subsequently, matches are attempted every five cycles (either EO or OE depending on the state) to ensure that there is no loss of frame. If a match fails, then MATCH is set to 0 and EO and OE matches are again attempted every cycle. Note that in particular embodiments, two frames are attempted to be matched at the same time (making it more unlikely to have a false match). Again, as shown in the flow chart, frame matching takes five cycles. As a result, a 5-cycle pipeline (or 5-slot deep FIFO), as illustrate in FIG. 15, may be required for the deskew channel data in order to perform the frame matching operation. As described later, the deskew channel data is also required for two more cycles.

FIGS. 16A and 16B are similar to FIGS. 13A and 13B, respectively, but also show timing information as well as signal information when matches should happen. Each column in FIGS. 16A and 16B represent the output of a register of the logic illustrated in FIG. 15 while each row represent a bit location in these registers.

Figure 17A:
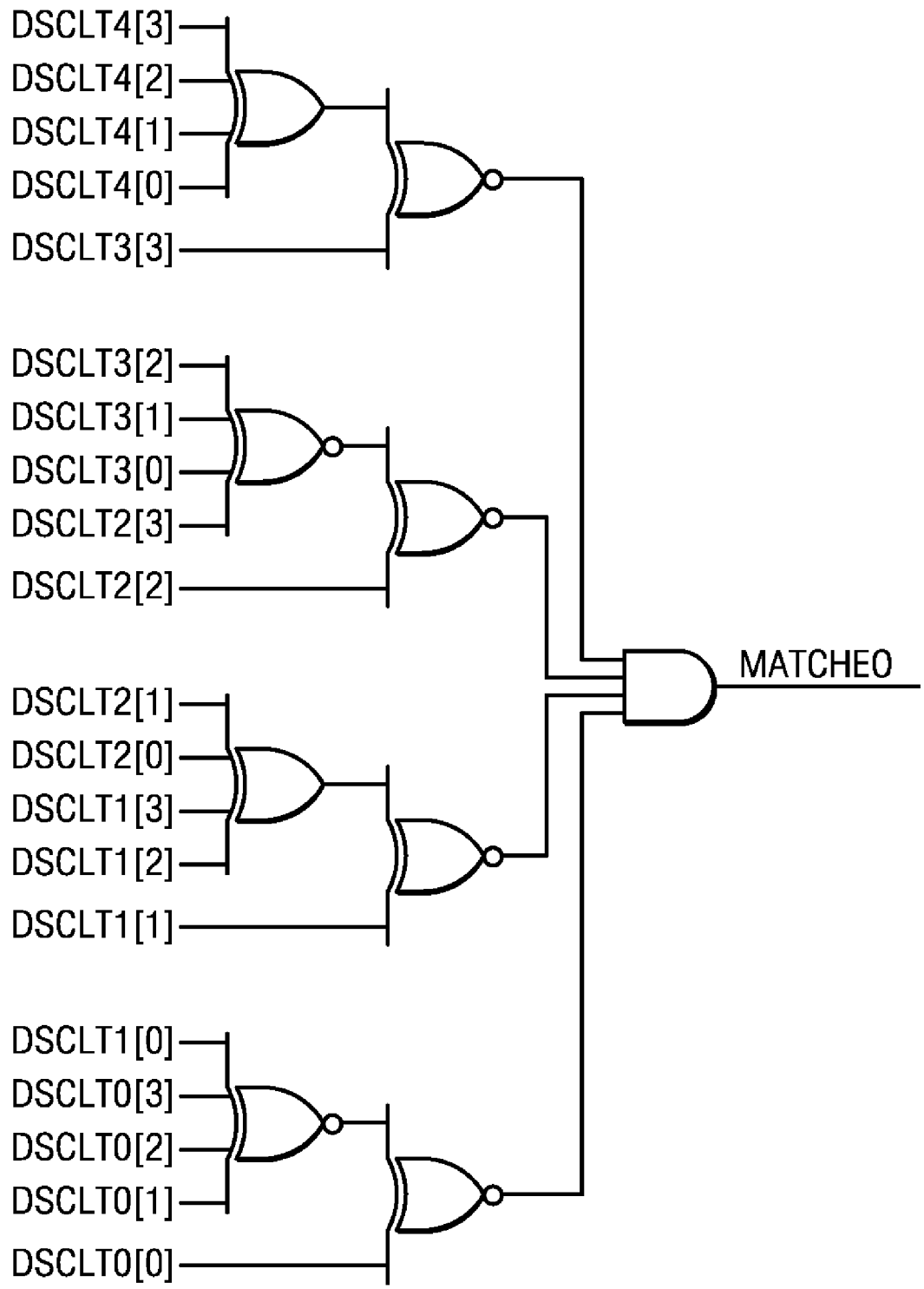
FIGS. 17A and 17B illustrate example logic within a deskew block for matching frame patterns.
Figure 17B:
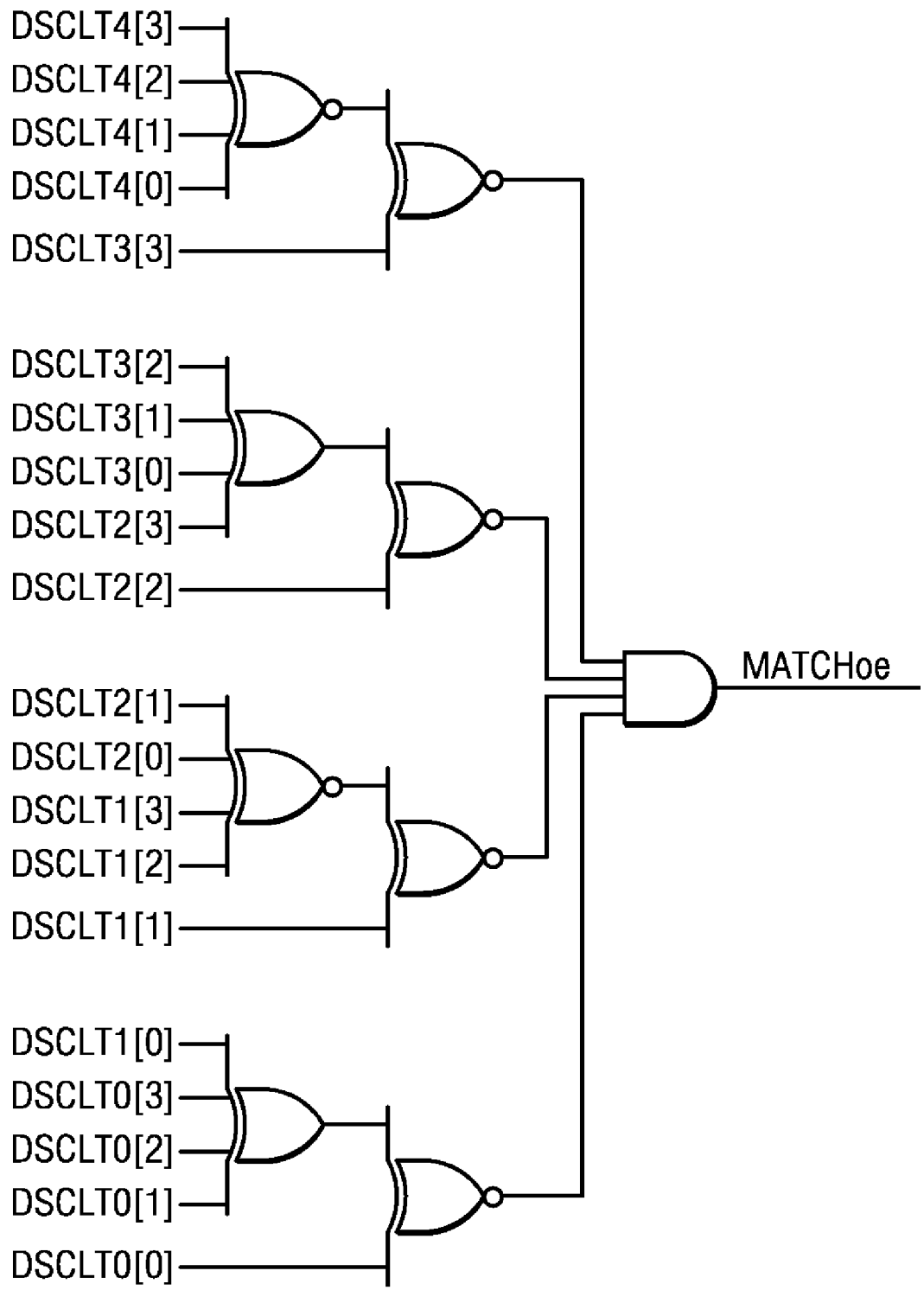

FIG. 17A illustrates an example circuit or logic within deskew block 1102 that may be used to match EO frame patterns while FIG. 17B illustrates an example circuit or logic within deskew block 1102 that may be used to match OE frame patterns. When a match has been found, the output of the match circuits may be checked every five cycles. By way of example, a 5-bit shift register, W[4:0], may be used to perform this task. When a match is found for the first time, W[4:0] may be set to 10000. Register W[4:0] may then rotate right every cycle. Assuming that it takes one cycle to set W[4:0] after the match has been found, the output of the frame match circuits of FIGS. 17A and 17B should be checked when W[0]=1.

Figure 18:
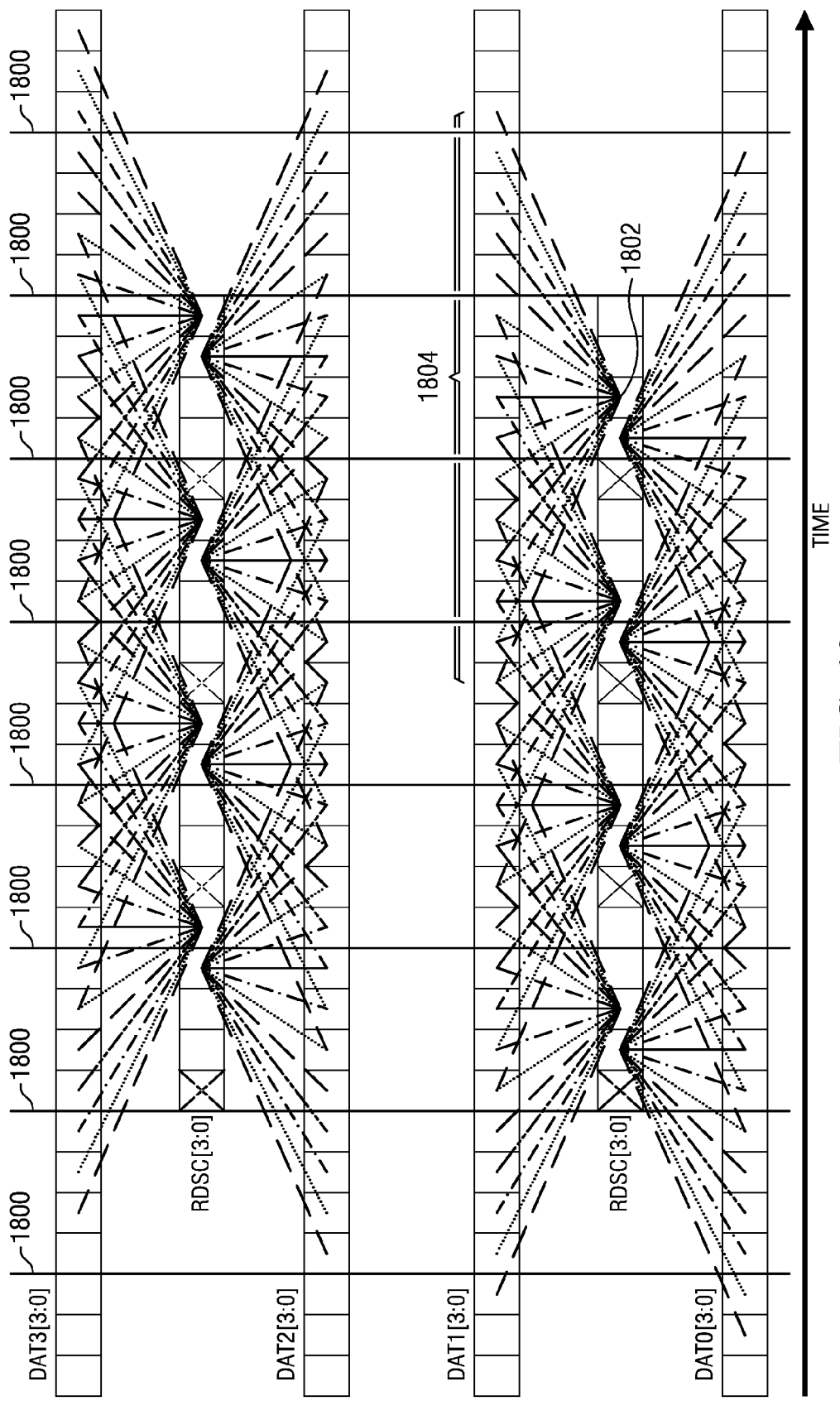
FIG. 18 illustrates the bit comparisons that may be made for determining skew.

In particular embodiment, deskew block 1102 also determines the skew between RDSC[3:0] and data channels DAT3 [3:0], DAT2[3:0], DAT1[3:0], and DAT0[3:0]. In particular embodiments, deskew block 1102 essentially determines pointers that may then be used to derive the output data from the data registers. In particular embodiments, since two deskew channel frames are matched in parallel, deskew block 1102 uses deskew bits that span a range of two frames in order to align the data channels DAT3[3:0], DAT2[3:0], DAT1[3: 0], and DAT0[3:0] to the deskew channel RDSC[3:0]. By way of example, this method may increase the probability that a correct match is obtained in the first try. FIG. 18 indicates the bit comparisons implemented in parallel in particular embodiments between bits in RDSC[3:0] and data channels DAT3[3:0], DAT2[3:0], DAT1[3:0], and DAT0[3:0] for a ±7 UI time difference (relative to the particular deskew channel bit from RDSC[3:0]). By way of example, in FIG. 18 bit 1802 in RDSC[3:0] would be compares with 15 bits 1804 in DAT1 [3:0]. In the figure, the deskew channel is repeated for illustrative purposes. The vertical lines 1800 indicate 4-bit boundaries (note that, although illustrated as serial streams, the deskew and data channels are actually 4-bit signals). Since the deskew frames have been matched, the bit position in the deskew channel has been determined. Bits marked with an "X" in FIG. 18 represent even or odd parity bits that are used in deskew control block 1212 to match the deskew frames and determine the bit positions within the RDSC[3:0] stream. Additionally, since bits from all of the channels are grouped into 4-bit vectors, in order to align the data channels DAT3 [3:0], DAT2[3:0], DAT1[3:0], and DAT0[3:0] with the deskew channel RDSC[3:0], the data in data channels DAT3 [3:0], DAT2[3:0], DAT1[3:0], and DAT0[3:0] may lead the RDSC[3:0] by two cycles. As a result, data that trails the deskew channel RDSC[3:0] may be required to be compared.

Figure 19:
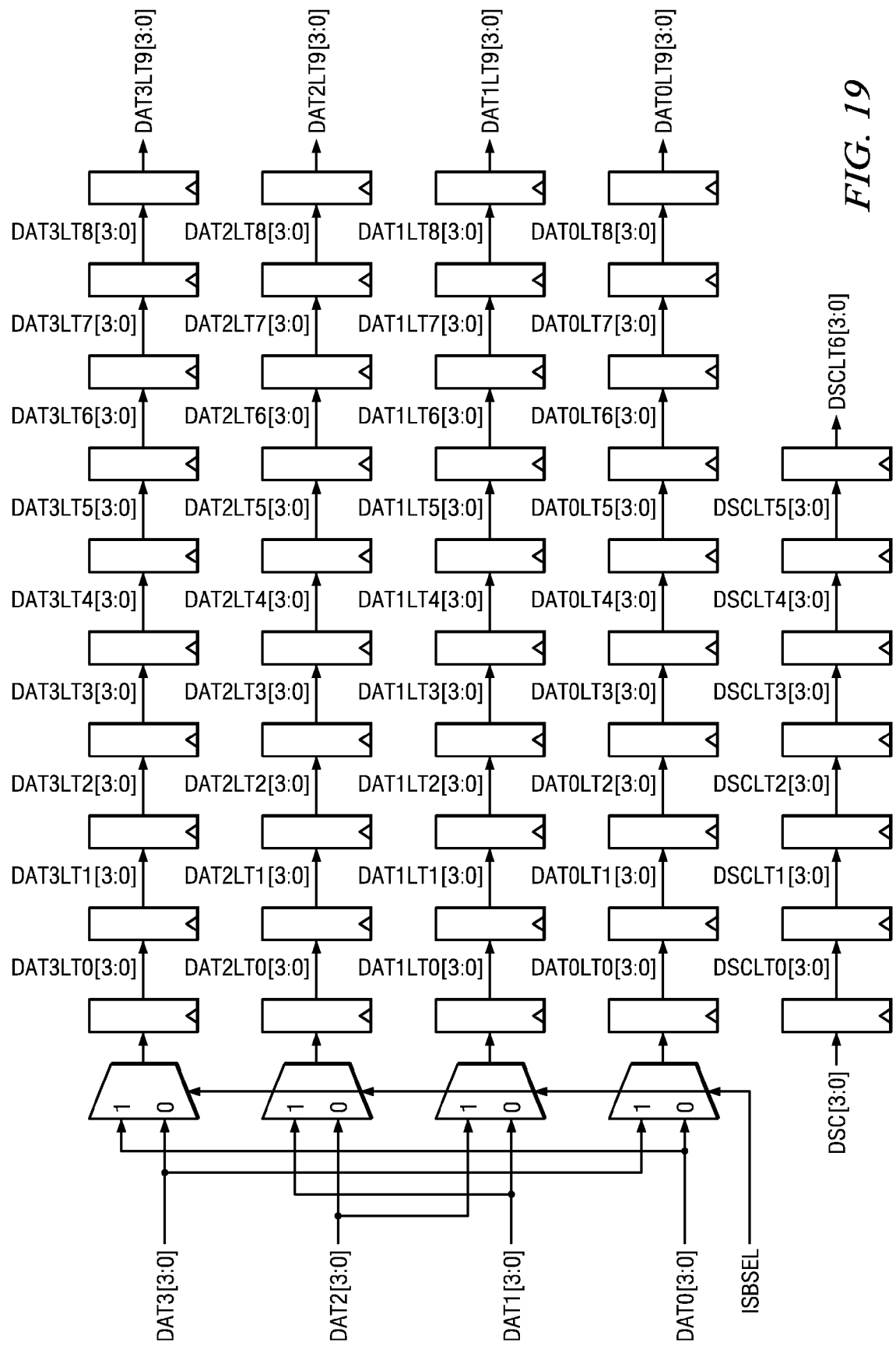
FIG. 19 illustrates an example deskew and data channel datapath.

FIG. 19 illustrates a complete example deskew and data channel data path suitable for use in deskew block 1102. As indicated in FIGS. 18 and 19, in order to align each data channel to the deskew channel, the logic of FIG. 19 may perform 15 4-bit equal/not-equal comparisons resulting in a total of 60 parallel 4-bit comparisons for each of the four data channels. Since, in the described embodiment, it takes five cycles to get all the bits for two frames, these comparisons may take up to five cycles to complete.

FIGS. 20A, 20B, 20C, and 20D illustrate the comparisons that may be made in particular embodiments in order to align data channels DAT3[3:0], DAT2[3:0], DAT1[3:0], and DAT0 [3:0] relative to deskew channel RDSC[3:0], respectively. For each case, the heading row indicates the bits from the deskew channel registers of FIG. 19 that may be compared with the respective bits in the corresponding data channel DAT3[3:0], DAT2[3:0], DAT1[3:0], or DAT0[3:0]. The remaining rows show the data bits that are compared for each case in order to determine the time difference between the corresponding data channel DAT3[3:0], DAT2[3:0], DAT1[3:0], and DAT0 [3:0], and the deskew channel RDSC[3:0]. The leftmost column indicates the resulting time difference in UI. Furthermore, the rightmost column indicates a 15-bit vector that stores the result of the respective comparisons.

Figure 21:
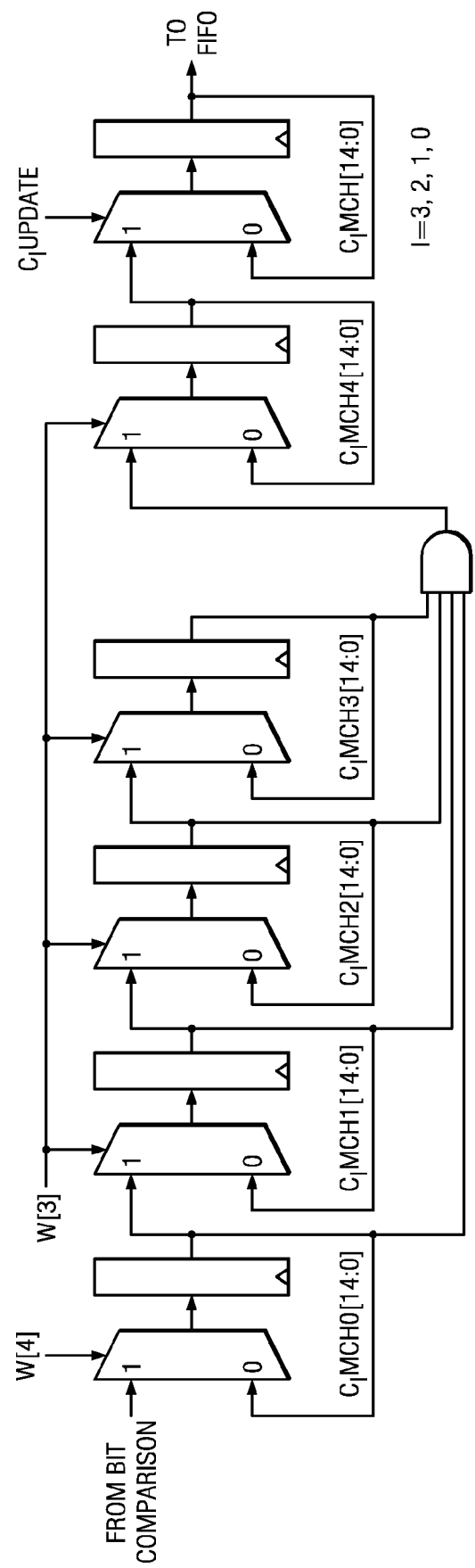
FIG. 21 illustrates an example of the pointer data path.
Figure 22A:
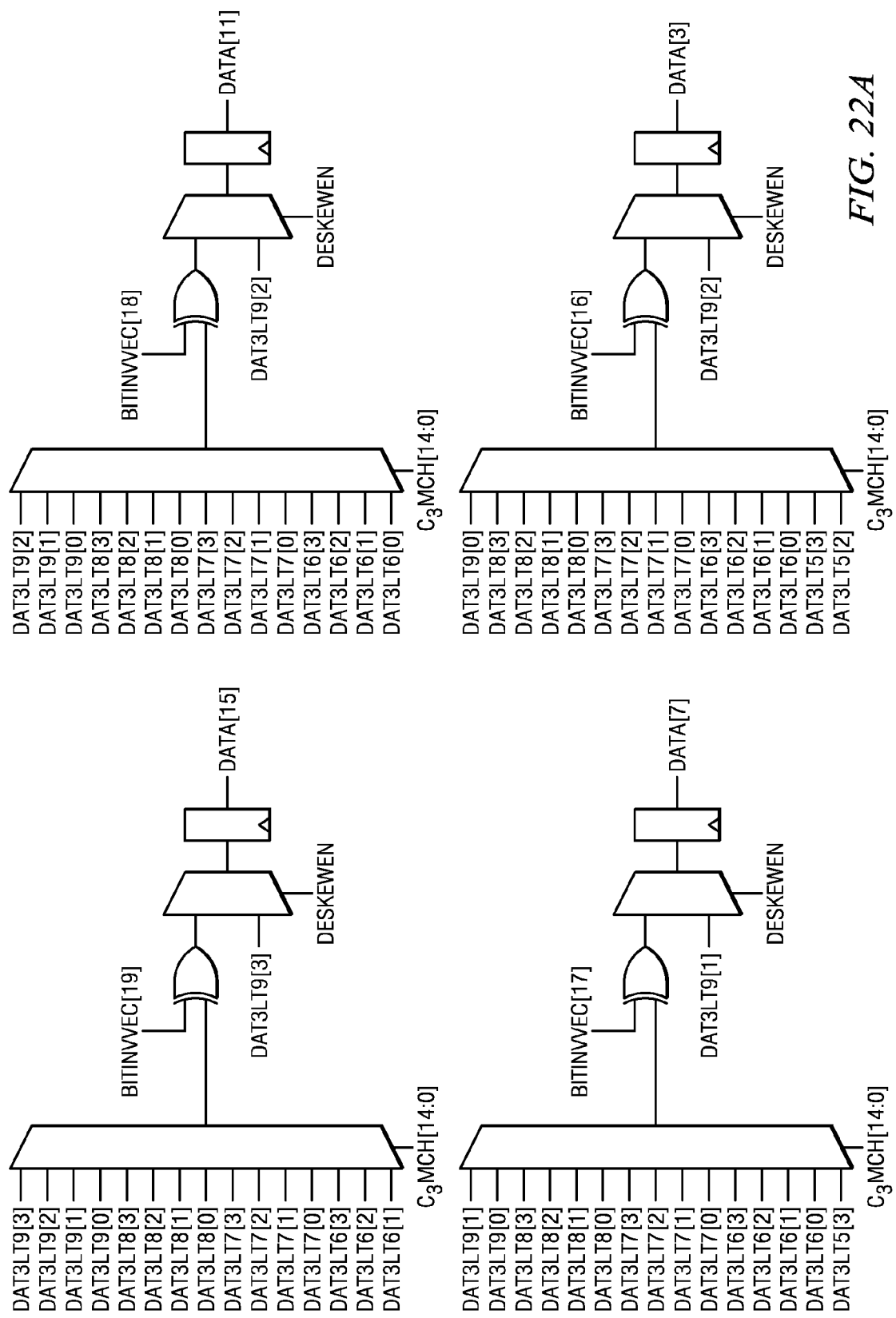
FIGS. 22A, 22B, 22C, and 22D illustrate example logic for selecting and interleaving bits from data channels.
Figure 22B:
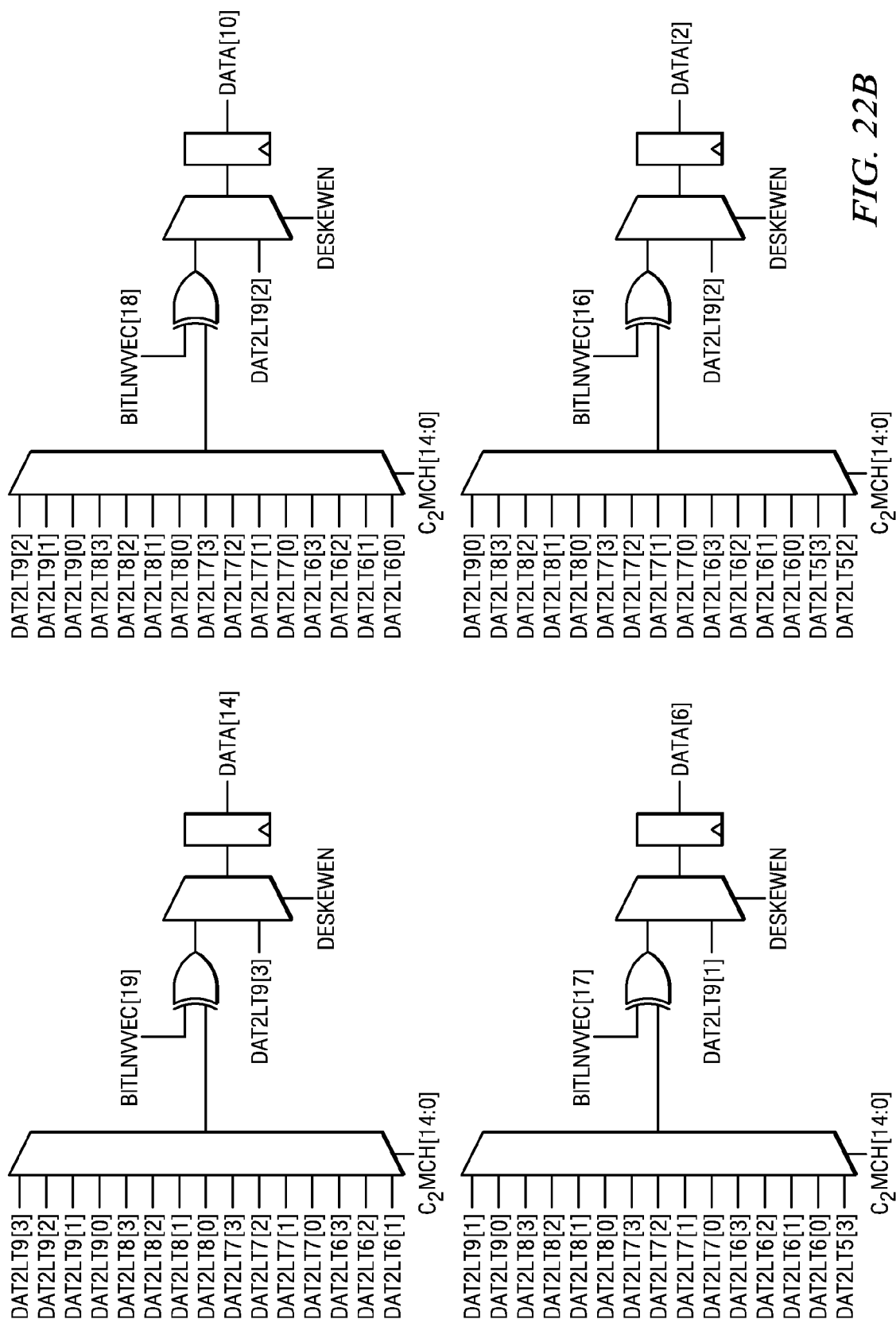
Figure 22C:
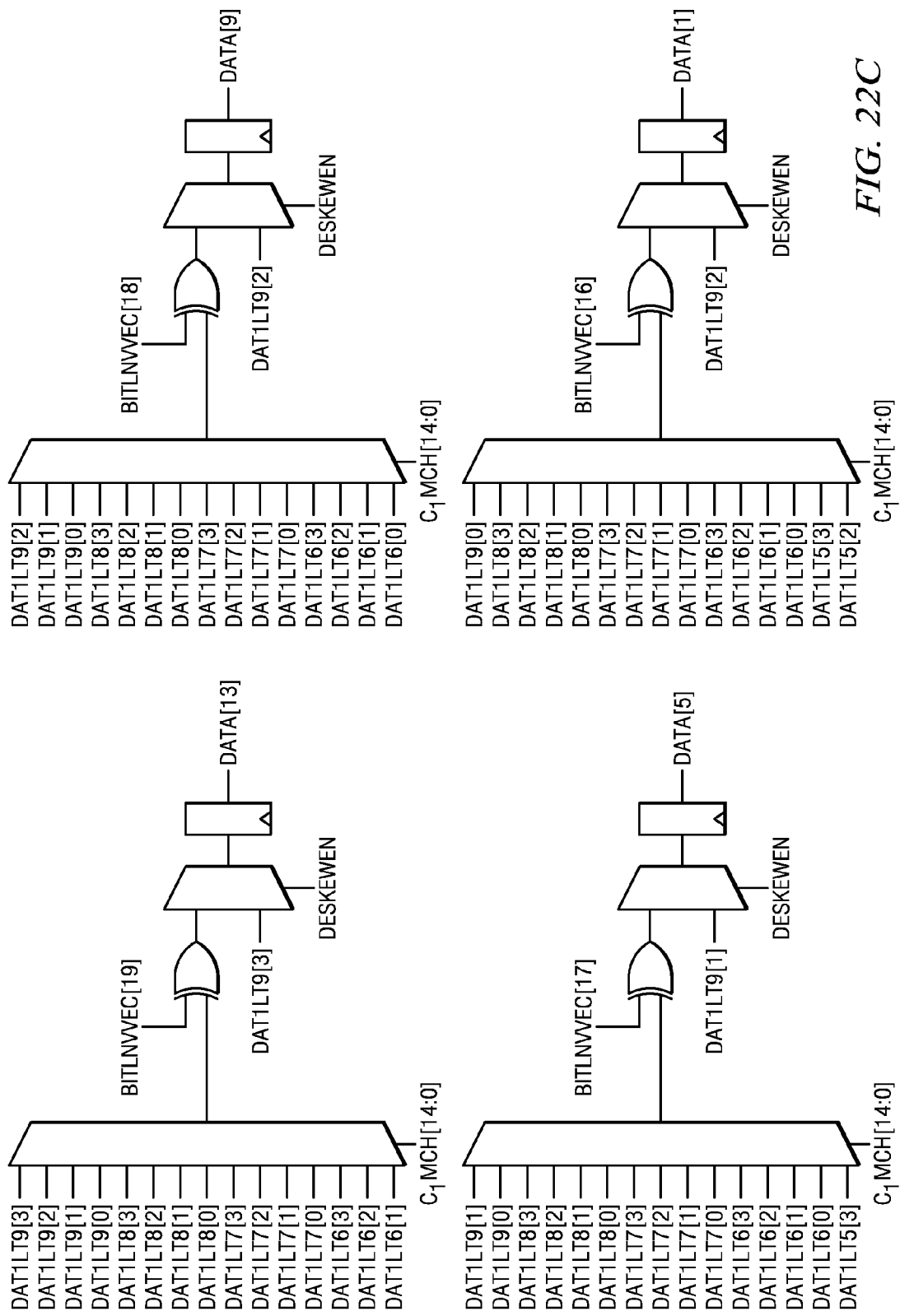
Figure 22D:
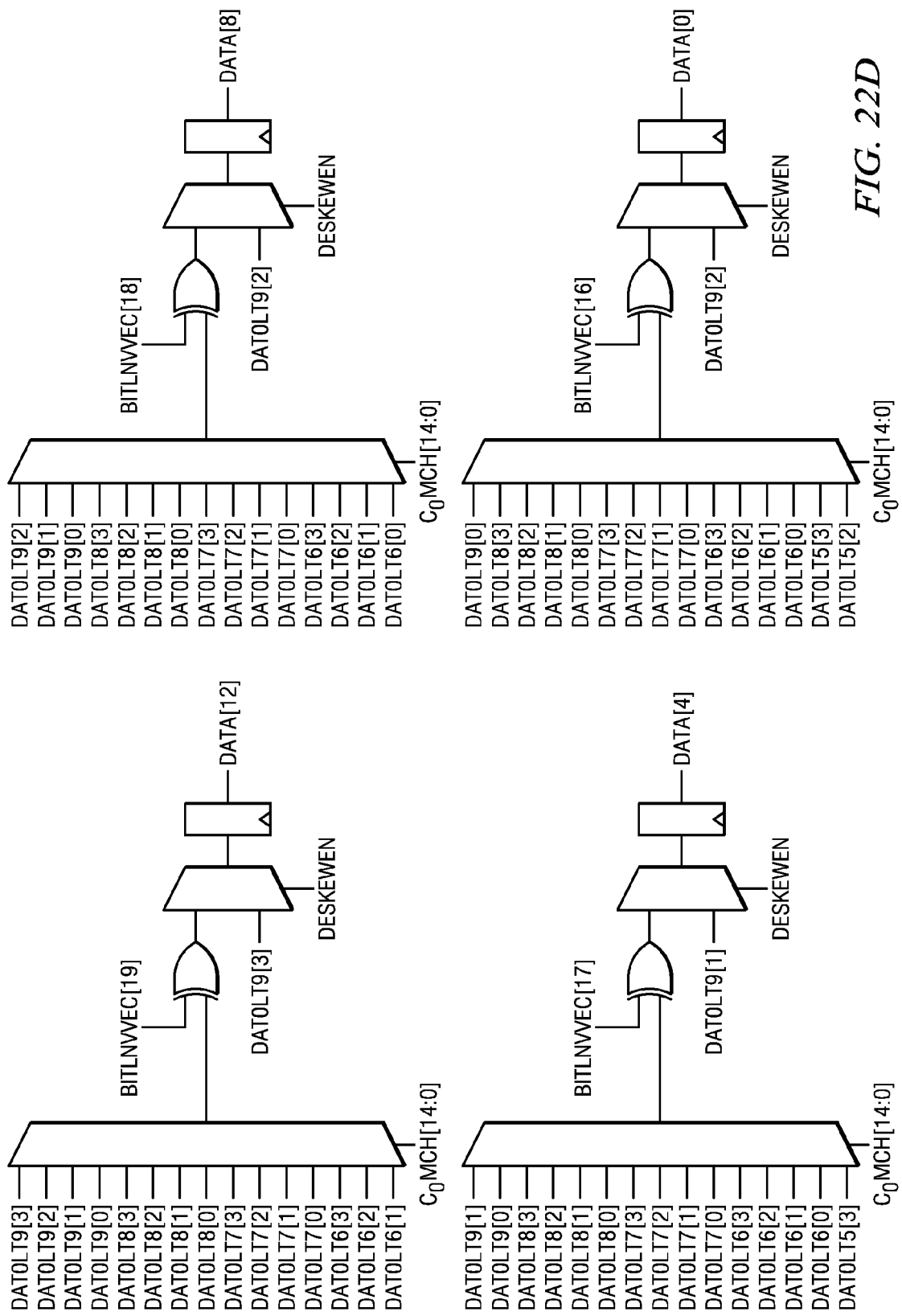

In particular embodiments, the results of the comparisons shown in FIGS. 20A, 20B, 20C, and 20D are valid only once every five cycles, as may be indicated by control signal W[4: 0]. Furthermore, although the bit comparisons span two frames, it is still generally possible to get multiple matches for each channel (e.g., one bit in RDSC[3:0] matches more than one bit in the corresponding data channel). Hence, in particular embodiments, deskew data block 1210 may further include an averaging filter to reduce the probability that multiple bits of the matching vectors are set to one. In an example embodiment, the averaging filter may be implemented in multiple parts. FIG. 21 illustrates the pointer data path that implements part of the averaging filter. The pointers are continuously calculated in deskew block 1210 as data is received over data channels DAT3[3:0], DAT2[3:0], DAT1[3:0], and DAT0[3:0]. The pointer data path of FIG. 21 may perform averaging by ANDing pointer samples from four consecutive frame pairs. The results of this averaging may then be stored into CiMCH4[14:0] once every five cycles. Depending on CiUPDATE, CiMCH4[14:0] gets passed along to CiMCH [14:0]. Signal CiUPDATE may be set by a finite state machine that controls the pointer generation and determines if the data channels DAT3[3:0], DAT2[3:0], DAT1[3:0], and DAT0[3: 0], and deskew channel RDSC[3:0] are aligned. Initially, when a match is found, CiUPDATE is set to 1, which allows CiMCH[14:0] to get updated by the corresponding incoming data signal.

In particular embodiments, after the pointers have been set, data bits from the four data channels DAT3[3:0], DAT2[3:0], DAT1[3:0], and DAT0[3:0] are combined to generate the 16-bit output DOUT[15:0]. In particular embodiments, the bits in the four data channels DAT3[3:0], DAT2[3:0], DAT1 [3:0], and DAT0[3:0] are interleaved and demultiplexed so that data bits 15, 11, 7, and 3 of each 16 bit data word come from DAT3[3:0], data bits 14, 10, 6, and 2 come from DAT2 [3:0], data bits 13, 9, 5, and 1 come from DAT1[3:0], and data bits 12, 8, 4, and 0 come from DAT0[3:0]. Additionally, if DBINV2 is set to 1, bits corresponding to odd nibbles may need to be inverted. A 20-bit vector bitInvVec may be used to specify which bits are inverted. Furthermore, if deskew block 1210 is disabled such as, by way of example, setting deskewEN to 0, the pointers from deskew block 1210 may be disregarded and the data may be directly passed to the output of deskew block 1210. FIGS. 22A, 22B, 22C, and 22D illustrate example logic for selecting and interleaving bits from data channels DAT3[3:0], DAT2[3:0], DAT1[3:0], and DAT0 [3:0], respectively, to form DOUT[15:0].

Figure 23:
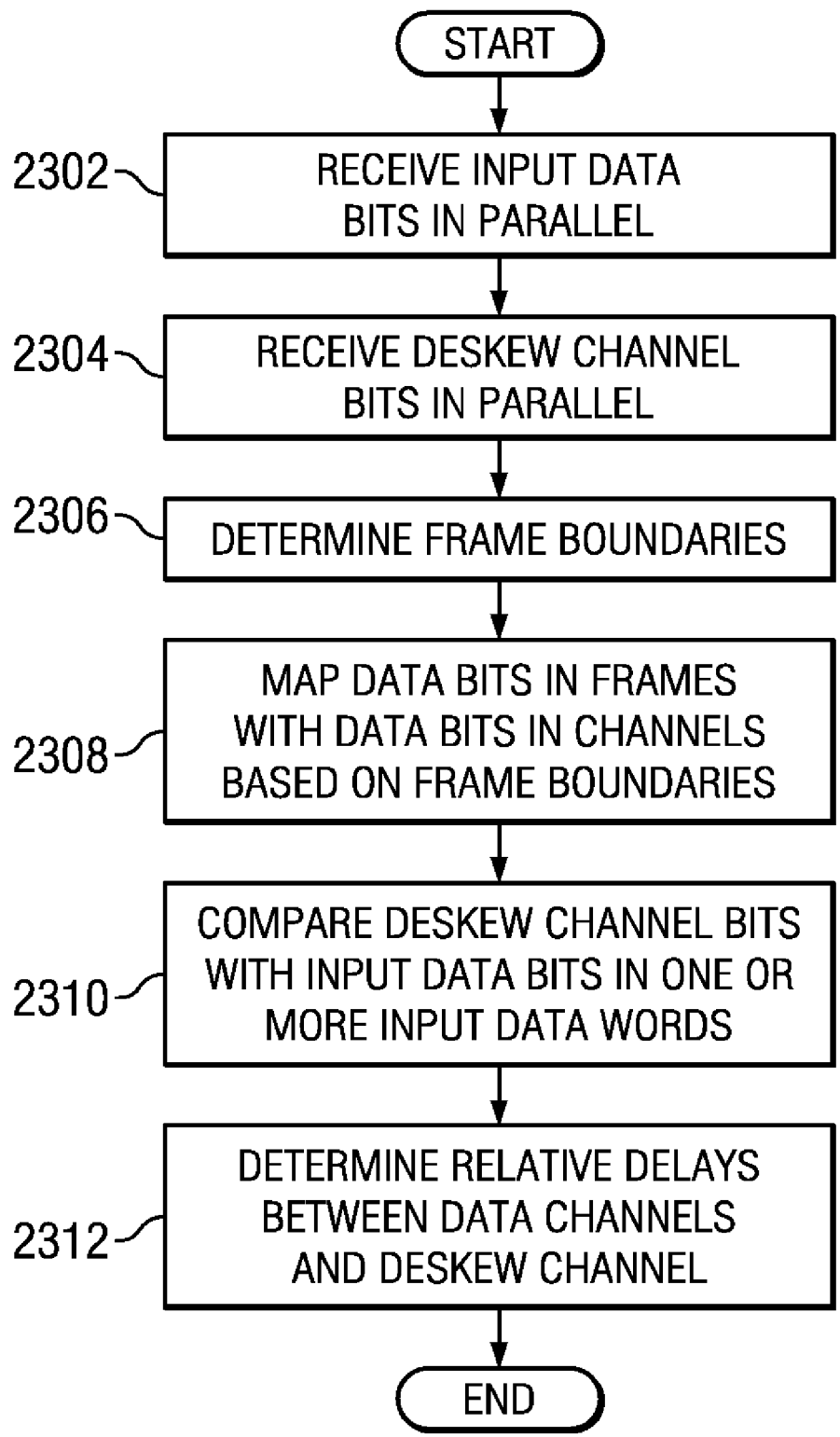
FIG. 23 shows a flowchart illustrating an example method for determining skew.

FIG. 23 shows a flowchart illustrating an example method for determining skew using a deskew channel. In particular embodiments, the method of FIG. 23 is performed entirely with digital CMOS technology. At 2302, the method includes receiving at a stream frequency, n input data bits in parallel from each of m parallel data channels. In an example embodiment, the n parallel input data bits having a stream frequency that is 1/n of the data channel frequency and the n×m input data bits from all the data channels arriving at the stream frequency collectively form an input data word. The m parallel data channels may have delays relative to each other in integer multiples of a channel clock period. At 2304, the method includes receiving at a stream frequency, n deskew channel bits in parallel from a deskew channel. In an example embodiment, the stream frequency is 1/n of the deskew channel frequency. In particular embodiments, the deskew channel includes a number of frames, each of the frames including x processed or unprocessed input data bits from the data channels. In particular embodiments, each of the frames further includes one or more framing bits. Generally, the deskew channel has delays relative to each of the m data channels in integer multiples of the channel clock period. At 2306, frame boundaries are determined by searching the n parallel deskew channel bits for the framing bits. At 2308, the data bits in each frame are mapped to the individual data channels based on the determined frame boundaries. At 2310, the x×y data bits from y frames within the parallel deskew channel are compared in parallel to the input data bits in one or more input data words. At 2312, the relative delays between the m parallel data channels and the deskew channel are determined.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method comprising:
in an entirely digital CMOS circuit:
receiving a plurality of input data bits at a collective data rate, the plurality of input data bits being grouped into a plurality of input data words, the plurality of input data bits of each of the input data words being received from a plurality of n parallel input-data-bit streams that are different from each other, each of the plurality of n parallel input-data-bit streams having a stream data rate that is 1/n of the collective data rate, each of the input data words comprising n consecutive ones of the input data bits;
selecting particular input data bits from the plurality of parallel input-data-bit streams; and
generating a k-bit deskew channel with the selected input data bits in parallel with the plurality of input-data-bit streams, the deskew channel comprising a number of frames, each of the frames comprising x input data bits from one or more input data words, each of the frames further comprising one or more framing bits.

2. The method of claim 1, further comprising multiplexing the plurality of n parallel input-data-bit streams into m l-bit data channels each having a channel data rate.

3. The method of claim 2, further comprising multiplexing the selected input data bits and the one or more framing bits in the k-bit deskew channel into a serial channel having a deskew channel data rate that is equal to the channel data rate.

4. The method of claim 3, further comprising:
generating one or more even and odd parity bits based on one or more of the input data words; and
using one or more of the one or more generated even and odd parity bits as the one or more framing bits.

5. The method of claim 4, wherein each of the frames comprises an even nibble and an odd nibble, each of the nibbles comprising x input data bits from one or two of the input data words followed by an even parity bit or an odd parity bit, the nibbles in each of the frames having alternating parities.

6. The method of claim 5, wherein:
n is 16;
k is 4;
x is 4;
l is 1; and
m is 4.

7. The method of claim 6, wherein:
the collective data rate is approximately 40 Gb/s;
the stream data rate is approximately 2.5 Gb/s; and
the deskew channel data rate is approximately 10 Gb/s.

8. The method of claim 7, wherein the deskew channel comprises a number of pairs of frames, each of the pairs comprising input data bits from y input data words, y being equal to z/n, z being a first common multiple of the collective data rate and n.

9. The method of claim 8, wherein multiplexing the plurality of n parallel input-data-bit streams into m l-bit data channels each having a channel data rate comprises:
sequentially multiplexing the 15th, 11th, 7th, and 3rd input data bits from each input data word into a fourth one of the data channels;
sequentially multiplexing the 14th, 10th, 6th, and 2nd input data bits from each input data word into a third one of the data channels;
sequentially multiplexing the 13th, 9th, 5th, and 1st input data bits from each input data word into a second one of the data channels; and
sequentially multiplexing the 12th, 8th, 4th, and 0th input data bits from each input data word into a first one of the data channels.

10. The method of claim 9, wherein, in each of the pairs of frames:
a first one of the nibbles of a first one of the frames comprises the 15th input data bit corresponding to a fifth one of the input data words from the fourth one of the data channels, followed by the 10th input data bit corresponding to the fifth one of the input data words from the third one of the data channels, followed by the 5th input data bit corresponding to the fifth one of the input data words from the second one of the data channels, followed by the 0th input data bit corresponding to the fifth one of the input data words from the first one of the data channels, followed by a first one of the even parity bits;
a second one of the nibbles of the first one of the frames comprises the 11th input data bit corresponding to a fourth one of the input data words from the fourth one of the data channels, followed by the 6th input data bit corresponding to the fourth one of the input data words from the third one of the data channels, followed by the 1st input data bit corresponding to the fourth one of the input data words from the second one of the data channels, followed by the 12th input data bit corresponding to a third one of the input data words from the first one of the data channels, followed by a first one of the odd parity bits;
a first one of the nibbles of a second one of the frames comprises the 7th input data bit corresponding to the third one of the input data words from the fourth one of the data channels, followed by the 2nd input data bit corresponding to the third one of the input data words from the third one of the data channels, followed by the 13th input data bit corresponding to a second one of the input data words from the second one of the data channels, followed by the 8th input data bit corresponding to the second one of the input data words from the first one of the data channels, followed by a second one of the even parity bits; and
a second one of the nibbles of the second one of the frames comprises the 3rd input data bit corresponding to the second one of the input data words from the fourth one of the data channels, followed by the 14th input data bit corresponding to a first one of the input data words from the third one of the data channels, followed by the 9th input data bit corresponding to the first one of the input data words from the second one of the data channels, followed by the 4th input data bit corresponding to the first one of the input data words from the first one of the data channels, followed by a second one of the odd parity bits.

11. The method of claim 5, further comprising:
receiving an inverter control signal; and
when the inverter control signal is enabled, processing the input data bits in the nibbles that include odd parity bits such that they are inverted.

12. A method comprising:
in an entirely digital CMOS circuit:
receiving at a stream frequency, a plurality n input data bits in parallel from each of a plurality of m parallel data channels, the plurality of n parallel input data bits having a stream frequency that is 1/n of a data channel frequency, the n xm input data bits from all the data channels arriving at the stream frequency collectively forming an input data word, the plurality of m parallel data channels having delays relative to each other in integer multiples of a channel clock period;
receiving at a stream frequency, n deskew channel bits in parallel from a deskew channel, the stream frequency being 1/n of the deskew channel frequency, the deskew channel consisting of frames, each of the frames comprising x processed or unprocessed input data bits from the data channels, each of the frames further comprising one or more framing bits, the deskew channel having delays relative to each of the m data channels in integer multiples of the channel clock period;
determining frame boundaries by searching the n parallel deskew channel bits for the framing bits;
mapping the data bits in each frame to the individual data channels based on the determined frame boundaries;
comparing, in parallel, the xxy data bits from y frames within the parallel deskew channel to the input data bits in one or more input data words; and
determining the relative delays between the plurality of m parallel data channels and the deskew channel.

13. The method of claim 12, wherein the one or more framing bits comprise one or more even parity bits and one or more odd parity bits.

14. The method of claim 13, further comprising selecting and rearranging the n×m input data bits in each input word to generate new output words such that the relative delays between the plurality of data channels are approximately eliminated.

15. The method of claim 14, further comprising filtering the determined relative delays to remove incorrect delays.

16. The method of claim 15, wherein each frame comprises an even nibble and an odd nibble, each of the nibbles comprising x input data bits from one or two of the input data words followed by an even parity bit or an odd parity bit, the nibbles in each of the frames having alternating parities.

17. The method of claim 16, wherein determining frame boundaries by searching the n parallel deskew channel bits for the framing bits and mapping the data bits in each frame to the individual data channels based on the determined frame boundaries comprises:
matching 20 deskew channel bits in parallel with a predetermined deskew-channel-bit pattern, the matching comprising matching even and odd parity bits in the 20 bits deskew channel bits with even and odd parity bits in the predetermined deskew-channel-bit pattern.

18. The method of claim 17, wherein comparing, in parallel, the x×y data bits from y frames within the parallel deskew channel to the input data bits in one or more input data words comprises matching the input data bits among the 20 deskew channel bits in parallel with the input data bits in the data channels, each of the deskew channel bits among the 20 deskew channel bits being matched with 15 input data bits in a particular one of the data channels, the input data bits in each of the data channels being matched with 4 deskew channel bits in parallel.

19. The method of claim 18, wherein matching each data bit among the 20 deskew channel bits with 15 input data bits in a particular one of the plurality of data channels comprises matching the deskew channel bit with:
the seven input data bits at the seven data-channel clock cycles immediately preceding the deskew channel bit;
the seven input data bits at the seven data-channel clock cycles immediately following the deskew channel bit; and
the input data bit at the data-channel clock cycle corresponding to the deskew channel bit.

20. The method of claim 19, further comprising reordering the input data bits to eliminate delays from −7 to +7 UI, where 1 UI is the channel clock period.

21. The method of claim 12, wherein n is 4, m is 4, x is 2×m, and y is 2.

22. The method of claim 21, wherein the data frequency is approximately 2.5 GHz.

23. The method of claim 22, wherein the deskew channel frequency is approximately 2.5 GHz.

24. A circuit comprising:
a deskew generator block configured to:
receive a plurality of input data bits at a collective data rate, the plurality of input data bits being grouped into a plurality of input data words, the plurality of input data bits of each of the input data words being received from a plurality of n parallel input-data-bit streams that are different, from each other, each of the plurality of n parallel input-data-bit streams having a stream data rate that is 1/n of the collective data rate, each of the input data words comprising n consecutive ones of the plurality of input data bits;
select particular input data bits from the plurality of parallel input-data-bit streams; and
generate a k-bit deskew channel with the selected input data bits in parallel with the plurality of input-data-bit streams, the deskew channel comprising a number of frames, each of the frames comprising x input data bits from one or more input data words, each of the frames further comprising one or more framing bits.

25. The circuit of claim 24, wherein the circuit further includes a multiplexer configured to multiplex the plurality of n parallel input-data-bit streams into m l-bit data channels each having a channel data rate.

26. The circuit of claim 25, wherein the circuit further includes a multiplexer configured to multiplex the selected input data bits and the one or more framing bits in the k-bit deskew channel into a serial channel having a deskew channel data rate that is equal to the channel data rate.

27. The circuit of claim 26, further comprising a parity generator configured to generate one or more even and odd parity bits based on one or more of the input data words, wherein the one or more of the one or more generated even and odd parity bits are used as the one or more framing bits.

28. The circuit of claim 27, wherein each of the frames comprises an even nibble and an odd nibble, each of the nibbles comprising x input data bits from one or two of the input data words followed by an even parity bit or an odd parity bit, the nibbles in each of the frames having alternating parities.

29. The circuit of claim 28, wherein:
n is 16;
k is 4;
x is 4;
l is 1; and
m is 4.

30. The circuit of claim 29, wherein:
the collective data rate is approximately 40 Gb/s;
the stream data rate is approximately 2.5 Gb/s; and
the deskew channel data rate is approximately 10 Gb/s.

31. The circuit of claim 30, wherein the deskew channel comprises a number of pairs of frames, each of the pairs comprising input data bits from y input data words, y being equal to z/n, z being a first common multiple of the collective data rate and n.

32. The circuit of claim 31, wherein in order to multiplex the plurality of n parallel input-data-bit streams into m l-bit data channels each having a channel data rate the multiplexer is configured to:
sequentially multiplex the 15th, 11th, 7th, and 3rd input data bits from each input data word into a fourth one of the data channels;
sequentially multiplex the 14th, 10th, 6th, and 2nd input data bits from each input data word into a third one of the data channels;
sequentially multiplex the 13th, 9th, 5th, and 1st input data bits from each input data word into a second one of the data channels; and
sequentially multiplex the 12th, 8th, 4th, and 0th input data bits from each input data word into a first one of the data channels.

33. The circuit of claim 32, wherein, in each of the pairs of frames:
a first one of the nibbles of a first one of the frames comprises the 15th input data bit corresponding to a fifth one of the input data words from the fourth one of the data channels, followed by the 10th input data bit corresponding to the fifth one of the input data words from the third one of the data channels, followed by the 5th input data bit corresponding to the fifth one of the input data words from the second one of the data channels, followed by the 0th input data bit corresponding to the fifth one of the input data words from the first one of the data channels, followed by a first one of the even parity bits;
a second one of the nibbles of the first one of the frames comprises the 11th input data bit corresponding to a fourth one of the input data words from the fourth one of the data channels, followed by the 6th input data bit corresponding to the fourth one of the input data words from the third one of the data channels, followed by the 1st input data bit corresponding to the fourth one of the input data words from the second one of the data channels, followed by the 12th input data bit corresponding to a third one of the input data words from the first one of the data channels, followed by a first one of the odd parity bits;
a first one of the nibbles of a second one of the frames comprises the 7th input data bit corresponding to the third one of the input data words from the fourth one of the data channels, followed by the 2nd input data bit corresponding to the third one of the input data words from the third one of the data channels, followed by the 13th input data bit corresponding to a second one of the input data words from the second one of the data channels, followed by the 8th input data bit corresponding to the second one of the input data words from the first one of the data channels, followed by a second one of the even parity bits; and
a second one of the nibbles of the second one of the frames comprises the 3rd input data bit corresponding to the second one of the input data words from the fourth one of the data channels, followed by the 14th input data bit corresponding to a first one of the input data words from the third one of the data channels, followed by the 9th input data bit corresponding to the first one of the input data words from the second one of the data channels, followed by the 4th input data bit corresponding to the first one of the input data words from the first one of the data channels, followed by a second one of the odd parity bits.

34. The circuit of claim 28, wherein the deskew generator block is further configured to:
receive an inverter control signal; and
when the inverter control signal is enabled, process the plurality of input data bits in the nibbles that include odd parity bits such that they are inverted.

35. A circuit comprising:
a deskew block configured to:
receive at a stream frequency, a plurality of n input data bits in parallel from each of a plurality of m parallel data channels, the plurality of n parallel input data bits having a stream frequency that is 1/n of a data channel frequency, the n×m input data bits from all the data channels arriving at the stream frequency collectively forming an input data word, the plurality of m parallel data channels having delays relative to each other in integer multiples of a channel clock period;
receive at a stream frequency, n deskew channel bits in parallel from a deskew channel, the stream frequency being 1/n of the deskew channel frequency, the deskew channel consisting of frames, each of the frames comprising x processed or unprocessed input data bits from the data channels, each of the frames further comprising one or more framing bits, the deskew channel having delays relative to each of the m data channels in integer multiples of the channel clock period;
determine frame boundaries by searching the n parallel deskew channel bits for the framing bits;
map the data bits in each frame to the individual data channels based on the determined frame boundaries;
compare, in parallel, the x×y data bits from y frames within the parallel deskew channel to the input data bits in one or more input data words; and
determine the relative delays between the plurality of m parallel data channels and the deskew channel.

36. The circuit of claim 35, wherein the one or more framing bits comprise one or more even parity bits and one or more odd parity bits.

37. The circuit of claim 36, wherein the circuit further includes an interleaver configured to select and rearrange the n×m input data bits in each input word to generate new output words such that the relative delays between the plurality of data channels are approximately eliminated.

38. The circuit of claim 37, further comprising a filter block configured to filter the determined relative delays to remove incorrect delays.

39. The circuit of claim 37, wherein each frame comprises an even nibble and an odd nibble, each of the nibbles comprising x input data bits from one or two of the input data words followed by an even parity bit or an odd parity bit, the nibbles in each of the frames having alternating parities.

40. The circuit of claim 39, wherein in order to determine frame boundaries by searching the n parallel deskew channel bits for the framing bits and map the data bits in each frame to the individual data channels based on the determined frame boundaries the deskew block is configured to:

match 20 deskew channel bits in parallel with a predetermined deskew-channel-bit pattern, the matching comprising matching even and odd parity bits in the 20 bits deskew channel bits with even and odd parity bits in the predetermined deskew-channel-bit pattern.

41. The circuit of claim 40, wherein in order to compare, in parallel, the x×y data bits from y frames within the parallel deskew channel to the input data bits in one or more input data words the deskew block is configured to:

match the input data bits among the 20 deskew channel bits in parallel with the input data bits in the data channels, each of the deskew channel bits among the 20 deskew channel bits being matched with 15 input data bits in a particular one of the data channels, the input data bits in each of the data channels being matched with 4 deskew channel bits in parallel.

42. The circuit of claim 41, wherein in order to match each data bit among the 20 deskew channel bits with 15 input data bits in a particular one of the plurality of data channels the deskew block is configured to match the deskew channel bit with:

the seven input data bits at the seven data-channel clock cycles immediately preceding the deskew channel bit;

the seven input data bits at the seven data-channel clock cycles immediately following the deskew channel bit; and the input data bit at the data-channel clock cycle corresponding to the deskew channel bit.

43. The circuit of claim 42, wherein the deskew block is further configured to reorder the input data bits to eliminate delays from −7 to +7 UI, where 1 UI is the channel clock period.

44. The circuit of claim 35, wherein n is 4, m is 4, x is 2×m, and y is 2.

45. The circuit of claim 44, wherein the data frequency is approximately 2.5 GHz.

46. The circuit of claim 45, wherein the deskew channel frequency is approximately 2.5 GHz.

47. A system comprising:

means for receiving a plurality of input data bits at a collective data rate, the plurality of input data bits being grouped into a plurality of input data words, the plurality of input data bits of each of the input data words being received from a plurality of n parallel input-data-bit streams that are different from each other, each of the plurality of n parallel input-data-bit streams having a stream data rate that is 1/n of the collective data rate, each of the input data words comprising n consecutive ones of the plurality of input data bits;

means for selecting particular input data bits from the plurality of parallel input-data-bit streams; and means for generating a k-bit deskew channel with the selected input data bits in parallel with the plurality of input-data-bit streams, the deskew channel comprising a number of frames, each of the frames comprising x input data bits from one or more input data words, each of the frames further comprising one or more framing bits.

48. A system comprising:

means for receiving at a stream frequency, a plurality of n input data bits in parallel from each of a plurality of m parallel data channels, the plurality of n parallel input data bits having a stream frequency that is 1/n of a data channel frequency, the n×m input data bits from all the data channels arriving at the stream frequency collectively forming an input data word, the plurality of m parallel data channels having delays relative to each other in integer multiples of a channel clock period;

means for receiving at a stream frequency, n deskew channel bits in parallel from a deskew channel, the stream frequency being 1/n of the deskew channel frequency, the deskew channel consisting of frames, each of the frames comprising x processed or unprocessed input data bits from the data channels, each of the frames further comprising one or more framing bits, the deskew channel having delays relative to each of the m data channels in integer multiples of the channel clock period;

means for determining frame boundaries by searching the n parallel deskew channel bits for the framing bits;

means for mapping the data bits in each frame to the individual data channels based on the determined frame boundaries;

means for comparing, in parallel, the x×y data bits from y frames within the parallel deskew channel to the input data bits in one or more input data words; and means for determining the relative delays between the plurality of m parallel data channels and the deskew channel.

* * * * *